(12) United States Patent
Sarashina

(10) Patent No.: US 9,178,646 B2
(45) Date of Patent: Nov. 3, 2015

(54) EXCHANGE DEVICE

(71) Applicant: Oki Electric Industry Co., Ltd., Tokyo (JP)

(72) Inventor: Masahiro Sarashina, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 425 days.

(21) Appl. No.: 13/679,467

(22) Filed: Nov. 16, 2012

(65) Prior Publication Data

US 2013/0230315 A1 Sep. 5, 2013

(30) Foreign Application Priority Data

Mar. 2, 2012 (JP) ................................. 2012-046561

(51) Int. Cl.
*H04J 14/00* (2006.01)
*H04J 14/02* (2006.01)
*H04B 10/079* (2013.01)

(52) U.S. Cl.
CPC ........ *H04J 14/0239* (2013.01); *H04B 10/0793* (2013.01); *H04B 10/0795* (2013.01); *H04J 14/025* (2013.01); *H04J 14/0246* (2013.01); *H04J 14/0247* (2013.01); *H04J 14/0252* (2013.01); *H04J 14/0272* (2013.01); *H04J 14/0282* (2013.01)

(58) Field of Classification Search
CPC . H04J 14/023; H04J 14/0232; H04J 14/0234; H04J 14/0227; H04J 14/0228; H04J 14/0239; H04J 14/0235; H04J 14/0236; H04J 14/0238; H04J 14/0252; H04J 14/0245; H04J 14/0246; H04J 14/0247; H04J 14/0249

USPC .......... 398/66, 67, 68, 69, 70, 71, 72, 79, 98, 398/99, 100, 58, 25, 33, 38; 370/352, 392, 370/389, 468, 395.4, 33, 38
See application file for complete search history.

(56) References Cited

U.S. PATENT DOCUMENTS 7,620,325 B2 * 11/2009 Mizutani et al. .............. 398/100
2011/0085795 A1 4/2011 Ozaki
2013/0183039 A1 * 7/2013 Hood et al. ..................... 398/72

FOREIGN PATENT DOCUMENTS

JP  2011-082908 A  4/2011
JP  2011-135280 A  7/2011

OTHER PUBLICATIONS

Japanese Office Action issued on Jul. 21, 2015 with English Translation.

* cited by examiner

Primary Examiner — Hanh Phan
(74) Attorney, Agent, or Firm — Rabin & Berdo, P.C.

(57) ABSTRACT

The exchange device groups PON branches into PON branch groups based on the amount of communication data traffic that has arrived via a communication network with a plurality of optical network units (ONUs) respectively belonging to one of a plurality of PON branches as a transmission destination, multiplexes the communication data for each PON group, and transmits the multiplexed data. The exchange device has an unit configured to transmit each piece of communication data from the ONUs to one output port selected from among a plurality of output ports based on the transmission wavelength of the communication data. The exchange device groups a plurality of PON branches into PON branch groups based on the required bandwidth of each of the ONUs, and designates the transmission wavelength for each of the ONUs so that each piece of the communication data from one PON branch group is transmitted to one port.

8 Claims, 19 Drawing Sheets

| SLOPE VALUE (Gbps) | THRESHOLD INCREASE/DECREASE AMOUNT (Gbps) |
|---|---|
| +1.000 | −10 |
| +0.500 | −5 |
| +0.250 | −3 |
| +0.125 | −1 |
| 0 | 0 |
| −0.125 | +1 |
| −0.250 | +3 |
| −0.500 | +5 |
| −1.000 | +10 |

FIG.13

|  |  | OUTPUT PORT PO | | | | |
|---|---|---|---|---|---|---|
|  |  | 1 | 2 | 3 | 4 | 5 |
| INPUT PORT PI | 1 | $\lambda 1$ | $\lambda 2$ | $\lambda 3$ | $\lambda 4$ | $\lambda 5$ |
|  | 2 | $\lambda 5$ | $\lambda 1$ | $\lambda 2$ | $\lambda 3$ | $\lambda 4$ |
|  | 3 | $\lambda 4$ | $\lambda 5$ | $\lambda 1$ | $\lambda 2$ | $\lambda 3$ |
|  | 4 | $\lambda 3$ | $\lambda 4$ | $\lambda 5$ | $\lambda 1$ | $\lambda 2$ |
|  | 5 | $\lambda 2$ | $\lambda 3$ | $\lambda 4$ | $\lambda 5$ | $\lambda 1$ |

FIG.17

| BRANCH SLOPE VALUE (Gbps) | ADDED BANDWIDTH AMOUNT (Gbps) |
|---|---|
| +1.000 | +10 |
| +0.500 | +5 |
| +0.250 | +3 |
| +0.125 | +1 |
| 0 | 0 |
| −0.125 | 0 |
| −0.250 | 0 |
| −0.500 | 0 |
| −1.000 | 0 |

EXCHANGE DEVICE

CROSS REFERENCE TO RELATED APPLICATION(S)

This application is based upon and claims benefit of priority from Japanese Patent Application No. 2012-046561, filed on Mar. 2, 2012, the entire contents of which are incorporated herein by reference.

BACKGROUND

The present disclosure relates to an exchange device controlling one or more optical network units (ONU) for a wavelength division multiplexing (WDM)/time division multiplexing (TDM)-passive optical network (PON).

Generally, in a WDM/TDM-PON, PON branches from a plurality of communication areas are taken as one PON branch based on WDM technology to improve the efficiency of bandwidth allocation for the entire communication area. For example, if an ONU requiring a large bandwidth is present, that ONU is allocated a large bandwidth by dedicating one wavelength to the PON branch that the ONU belongs to. This allocation is carried out by controlling the PON branch in one of the transmission devices that is included in an exchange device. Conversely, if a plurality of PON branches that do not require a large bandwidth are present, the plurality of PON branches are controlled together in one of the transmission devices included in the exchange device. Thus, by collectively controlling PON branches that have a small required bandwidth, the total number of operations in a transmission device is decreased, which allows power consumption to be reduced (e.g., JP 2011-82908A (US2011/085795) and JP 2011-135280A).

One method for realizing such an operation is wavelength routing, which uses a tunable transmission device and an AWG (arrayed waveguide grating). When using such devices, the routing destination of the data can be changed by changing the wavelength setting to the transmission device. Consequently, data can be allocated to the respective PON branches and transmitted with one transmission device by changing the wavelength setting to the transmission device for each piece of data. Namely, a plurality of PON branches can be controlled by one transmission device, thereby enabling lower power consumption.

SUMMARY

The method for determining the combination of PON branches to be controlled by one transmission device can be carried out based on the required bandwidth of the PON branches. In this case, the PON branches are combined by setting the maximum data rate of the transmission device as a threshold, so that when the required bandwidth of the respective PON branches is integrated, the product does not exceed the threshold.

However, when such a method is employed, since PON branches are combined until the integration value of the required bandwidth reaches the maximum data rate, this can result in a situation in which the transmission device controlling the plurality of PON branches according to this combination has little or no spare bandwidth. In such a state, there is the problem that the transmission device has insufficient allocated bandwidth and cannot handle a sudden increase in PON branch required bandwidth.

The present disclosure, which was written in view of the above-described problems, recognizes that there is a need for an exchange device capable of realizing lower power consumption and capable of coping with a sudden increase in PON branch required bandwidth.

According to an embodiment of the present disclosure, there is provided an exchange device including a multiplexing unit configured to generate a plurality of series of multiplexed data by multiplexing for each PON branch group communication data having as a transmission destination any of a plurality of optical network units respectively belonging to one of a plurality of PON branches, a wavelength designation unit configured to designate a transmission wavelength corresponding to the PON branches for each piece of communication data, a plurality of transmission unit configured to transmit each piece of communication data forming the multiplexed data using a carrier wave of the designated transmission wavelength, a selection and transmission unit configured to transmit each piece of transmitted communication data to one of the plurality of PON branches selected based on the transmission wavelength, and a combination change unit configured to change a combination of the PON branches included in the PON branch group based on a traffic amount of the communication data.

Further, according to an embodiment of the present disclosure, there is provided an exchange device including a selection and transmission unit configured to multiplex communication data that has arrived via an optical transmission path from a plurality of optical network units respectively belonging to one of a plurality of PON branches and transmitting the multiplexed data to one output port selected from among a plurality of output ports based on the transmission wavelength of the communication data, a plurality of receiving units each receiving the communication data via one of the output ports, a grouping unit configured to group the plurality of PON branches into PON branch groups based on the required bandwidth of each of the optical network units, and a transmission wavelength designation unit configured to designate the transmission wavelength for each of the optical network units so that each piece of the communication data from one of the PON branch groups is transmitted to one of the ports by the selection and transmission unit.

The exchange device according to the present disclosure can handle a sudden increase in PON branch required bandwidth while realizing lower power consumption.

BRIEF DESCRIPTION OF THE DRAWINGS

FIG. 13 is a diagram illustrating an example of a wavelength correspondence table for input ports and output ports;

FIG. 17 illustrates an example of an added bandwidth table stored by an added bandwidth determination unit;

DETAILED DESCRIPTION OF THE EMBODIMENT(S)

Embodiments of the present disclosure will now be described in more detail with reference to the attached drawings.

<First Embodiment>

Figure 1:
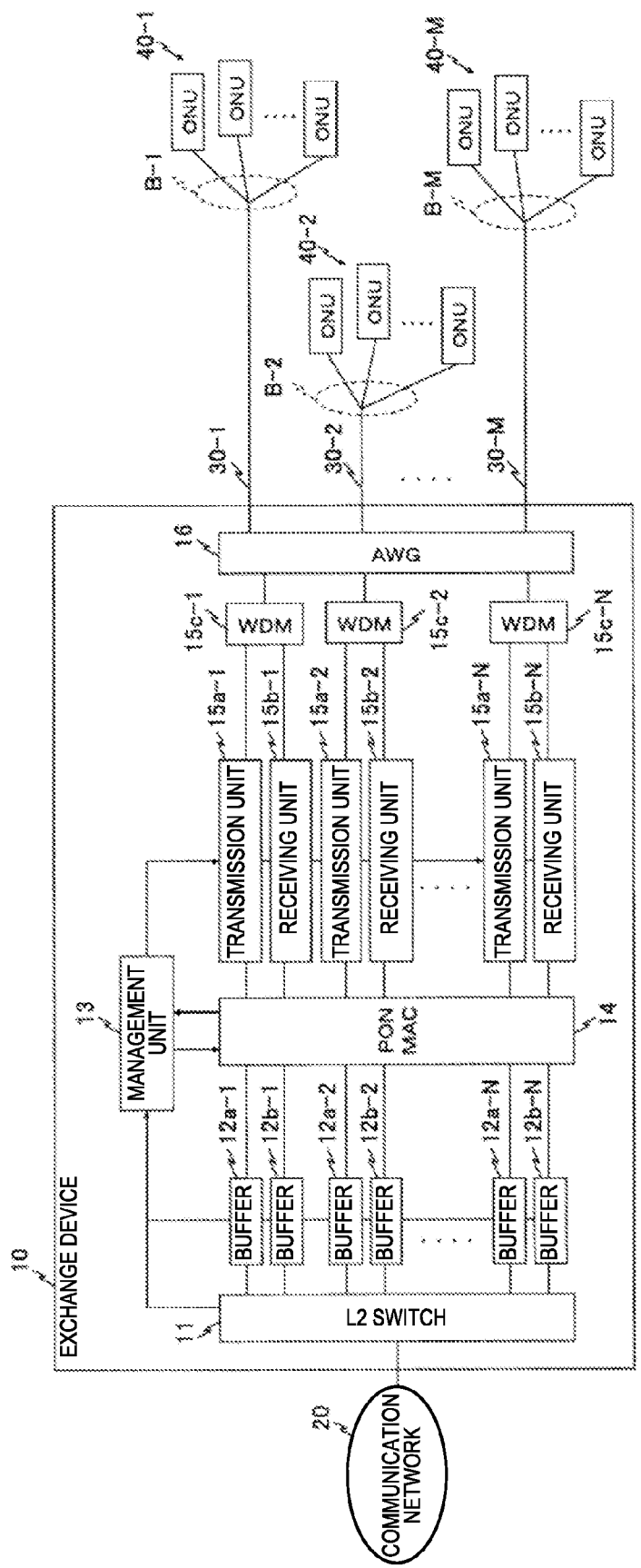
FIG. 1 is a block diagram illustrating a configuration of an exchange device according to the present disclosure with ONUs.

FIG. 1 illustrates a configuration of an exchange device 10, which is an embodiment of the present disclosure. The exchange device 10 houses ONU groups 40-1 to 40-M (wherein M is an integer of 2 or more), which are optical network units on a subscriber side, via optical transmission paths 30-1 to 30-M, such as an optical fiber, that act as an optical line terminal (OLT) on a telecommunications carrier side in a PON system that uses wavelength division multiplexing (WDM) technology in combination with time division multiplexing (TDM) technology. The ONU groups 40-1 to 40-M are respectively associated with PON branches B-1 to B-M. The communication direction from a communication network 20, which is a higher-level network, to the ONU groups 40-1 to 40-M will be referred to "downlink", and the opposite direction as "uplink".

An embodiment relating to downlink direction communication will now be described.

An L2 switch 11 receives data that has arrived from the communication network 20 (hereinafter referred to as "downlink data"), which is a higher-level network, and separates it into data for each ONU group. Note that instead of the communication network 20 according to the present embodiment, a device such as a server that generates data may be connected to the L2 switch 11.

Buffers 12a-1 to 12a-N (wherein N is an integer of 2 or more) accumulate this separated data in each ONU.

A management unit 13 monitors the L2 switch 11 or the buffers 12a-1 to 12a-N, and calculates a required bandwidth for each of the PON branches B-1 to B-M based on the amount of traffic of each ONU. Then, the management unit 13 groups the PON branches B-1 to B-M into a plurality of PON branch groups based on the required bandwidth. The management unit 13 periodically or intermittently changes the combination of PON branches included in the PON branch groups (i.e., is combination change unit). The management unit 13 notifies a PON MAC 14 of the combination. This notification will be referred to below as a "combination notification". Further, the management unit 13 performs a transmission wavelength designation for the data allocated to each time slot for each transmission unit 15a-1 to 15a-N based on a below-described time slot configuration notification from the PON MAC 14 (i.e., is wavelength designation unit).

The PON MAC 14 generates a plurality of series of time division multiplexed data by time division multiplexing the downlink data accumulated in the buffers 12a-1 to 12a-N for each PON branch group indicated by the combination notification from the management unit 13 (i.e., is multiplexing unit). Further, the PON MAC 14 issues a notification (time slot combination notification) indicating the configuration of the time slot in which the downlink data was time division multiplexed.

The transmission units 15a-1 to 15a-N transmit the time division multiplexed downlink data using a carrier wave of the transmission wavelength designated for each piece of downlink data. Transmission wavelength designation is carried out by the management unit 13. The transmission units 15a-1 to 15a-N are configured from a laser diode, for example.

WDM 15c-1 to 15c-N perform wavelength selection on the uplink data that has arrived via the optical transmission paths 30-1 to 30-M to prevent the returning light of the data transmitted by the transmission units 15a-1 to 15a-N from having an effect on receiving units 15b-1 to 15b-N.

An AWG 16 transmits each piece of transmitted downlink data along one of the optical transmission paths 30-1 to 30-M as a route selected based on the transmission wavelength (i.e., is selection and transmission unit).

Figure 2:
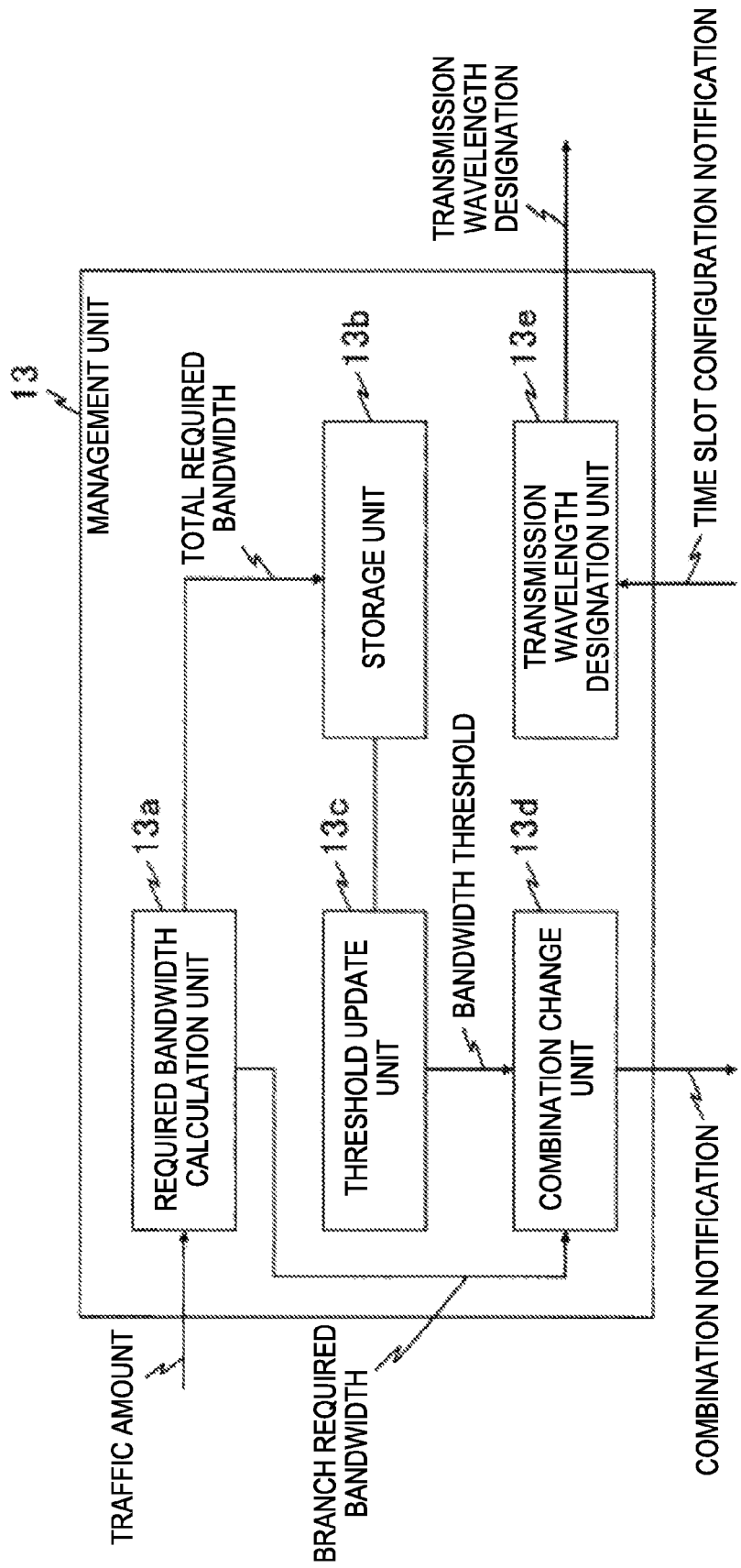
FIG. 2 is a block diagram illustrating a configuration of a management unit according to a first embodiment.

FIG. 2 illustrates a configuration of the management unit 13.

A required bandwidth calculation unit 13a monitors the amount of traffic passing through each ONU at the L2 switch 11 or the amount of traffic of each ONU accumulated in the buffers 12a-1 to 12a-N, and periodically or intermittently calculates the required bandwidth of each ONU (hereinafter referred to as an "ONU required bandwidth"). Further, the required bandwidth calculation unit 13a calculates a total required bandwidth by adding the ONU required bandwidth for all of the ONUs.

If the ONU required bandwidth is considered as traffic(t,n) (wherein t represents the minimum time unit and n represents the total number of ONUs), the total required bandwidth all_traffic (t) can be calculated based on the following formula.

[Math. 1]

$$\text{all\_traffic}(t) = \sum_n \text{traffic}(t, n) \quad \text{(Equation 1)}$$

Further, the required bandwidth calculation unit 13a calculates the required bandwidth for each of the PON branches B-1 to B-M from the ONU required bandwidth (hereinafter referred to as "branch required bandwidth"). The branch required bandwidth for a given PON branch can be obtained by adding the ONU required bandwidth for each ONU belonging to that PON branch.

A storage unit 13b stores the total required bandwidth that is periodically or intermittently calculated by the required bandwidth calculation unit 13a. Further, the storage unit 13b also stores the average required bandwidth calculated by a below-described threshold update unit 13c.

The threshold update unit 13c updates a setting threshold each time an update time arrives. The update times arrive at fixed update intervals. More specifically, the threshold update unit 13c calculates the average value (hereinafter referred to as "average required bandwidth") of the total required bandwidth included within an update interval (period between the previous update time to the current update time) using the total required bandwidth stored in the storage unit 13b. The calculated average required bandwidth is stored in the storage unit 13b.

If the update interval is considered as T, the average required bandwidth ave_traffic (T) can be calculated based on the following equation.

[Math. 2]

$$\text{ave\_traffic}(T) = \left\{ \sum_t \text{all\_traffic}(t) \right\} / T \quad \text{(Equation 2)}$$

Next, the threshold update unit 13c calculates a slope value. More specifically, the threshold update unit 13c compares the current average required bandwidth with the immediately prior average required bandwidth, and if the current average required bandwidth is greater denotes the value with a plus, if the current average required bandwidth is smaller denotes the value with a minus, and if the current average required bandwidth is the same denotes the value with a zero. Further, the threshold update unit 13c determines the amount of change in the current average required bandwidth from the immediately prior average required bandwidth (hereinafter referred to as "bandwidth change amount").

If the line rate of each of the transmission units 15a-1 to 15a-N is considered as RL, and the total number of PON branches as Mmax, the slope value slop(T) can be calculated based on the following equation.

[Math. 3]

$$\text{slop}(T) = \{\text{ave\_traffic}(t) - \text{ave\_traffic}(t-1)\} / (RL \times M\text{max}) \quad \text{(Equation 3)}$$

For example, if RL=10 Gbps, Mmax=8, and the current average required bandwidth is greater than the immediately prior average required bandwidth by 10 Gbps, the slope value is 0.125.

Next, the threshold update unit 13c increases/decreases the setting threshold based on the slope value. More specifically, the threshold update unit 13c decreases the setting threshold if the slope value is positive, increases the setting threshold if the slope value is negative, and does not change the setting threshold if the slope value is zero. At this stage, the threshold update unit 13c changes the setting threshold by a larger amount the greater the bandwidth change amount is. For example, if the slope value is +0.125, the threshold update unit 13c decreases the setting threshold by 1 Gbps, and if the slope value is +0.5, the threshold update unit 13c decreases the setting threshold by 5 Gbps.

Figures 3, 4:
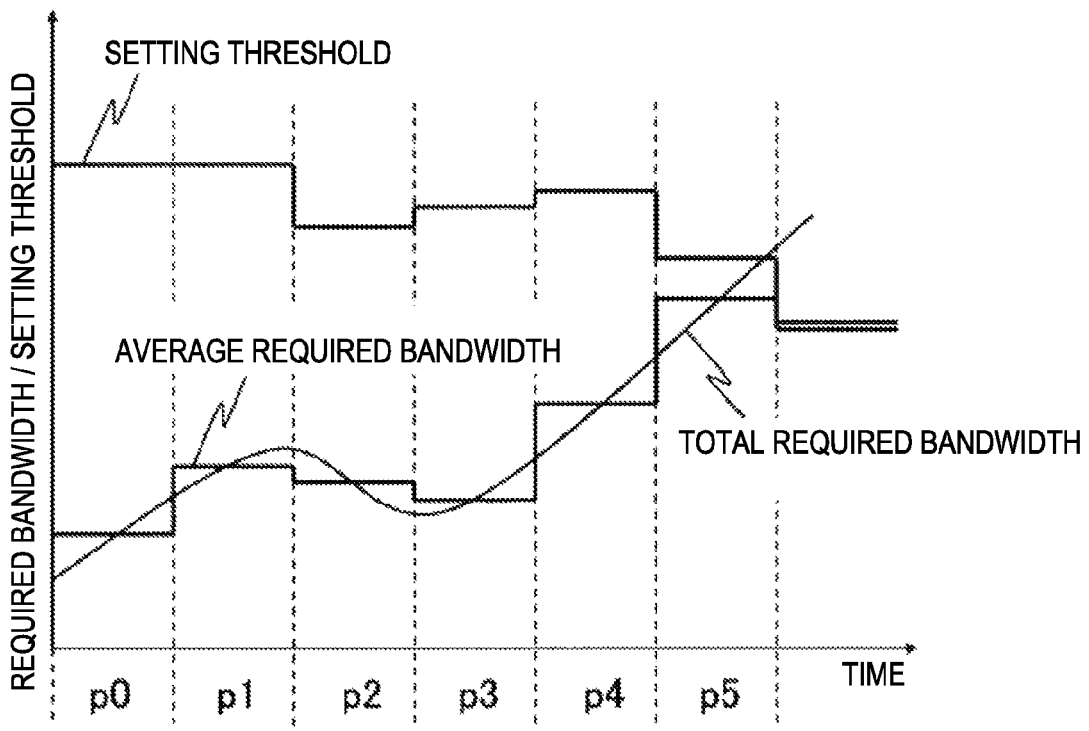
FIG. 3 is an example of a bandwidth threshold table stored by a threshold update unit.
FIG. 4 is a graph illustrating a setting threshold to be updated along with a required bandwidth and an average value thereof.

The threshold update unit 13c stores the bandwidth threshold table illustrated in FIG. 3, for example. In the bandwidth threshold table, slope values are associated with threshold increase/decrease amounts. The threshold update unit 13c determines the increase/decrease amount of the setting threshold based on this association. For example, if the slope value is +0.250, the setting threshold is decreased by 3 Gbps, and if the slope value is −0.250, the setting threshold is increased by 3 Gbps.

FIG. 4 illustrates a setting threshold to be updated by the threshold update unit 13c along with the total required bandwidth and the average required bandwidth. The setting threshold for an update interval p2 is smaller than the setting threshold for an update interval p1. This is because the threshold update unit 13c decreased the setting threshold to reflect the fact that the average required bandwidth of the update interval p1 is greater than the average required bandwidth of an update interval p0. Further, the setting threshold for an update interval p3 is greater than the setting threshold for the update interval p2. This is because the threshold update unit 13c increased the setting threshold to reflect the fact that the average required bandwidth of the update interval p2 is greater than the average required bandwidth of an update interval p1.

The variation from the setting threshold of the update interval p2 to the setting threshold of the update interval p3 is smaller than the variation from the setting threshold of the update interval p1 to the setting threshold of the update interval p2. This is because the amount of change from the average required bandwidth of the update interval p1 to the average required bandwidth of the update interval p1 is smaller than the amount of change from the average required bandwidth of the update interval p0 to the average required bandwidth of the update interval p1. The setting threshold is similarly updated for the update intervals after update interval p3.

After the setting threshold has been updated, a combination change unit 13d determines the PON branch combination so that the total of the branch required bandwidths does not exceed the setting threshold.

Figure 5:
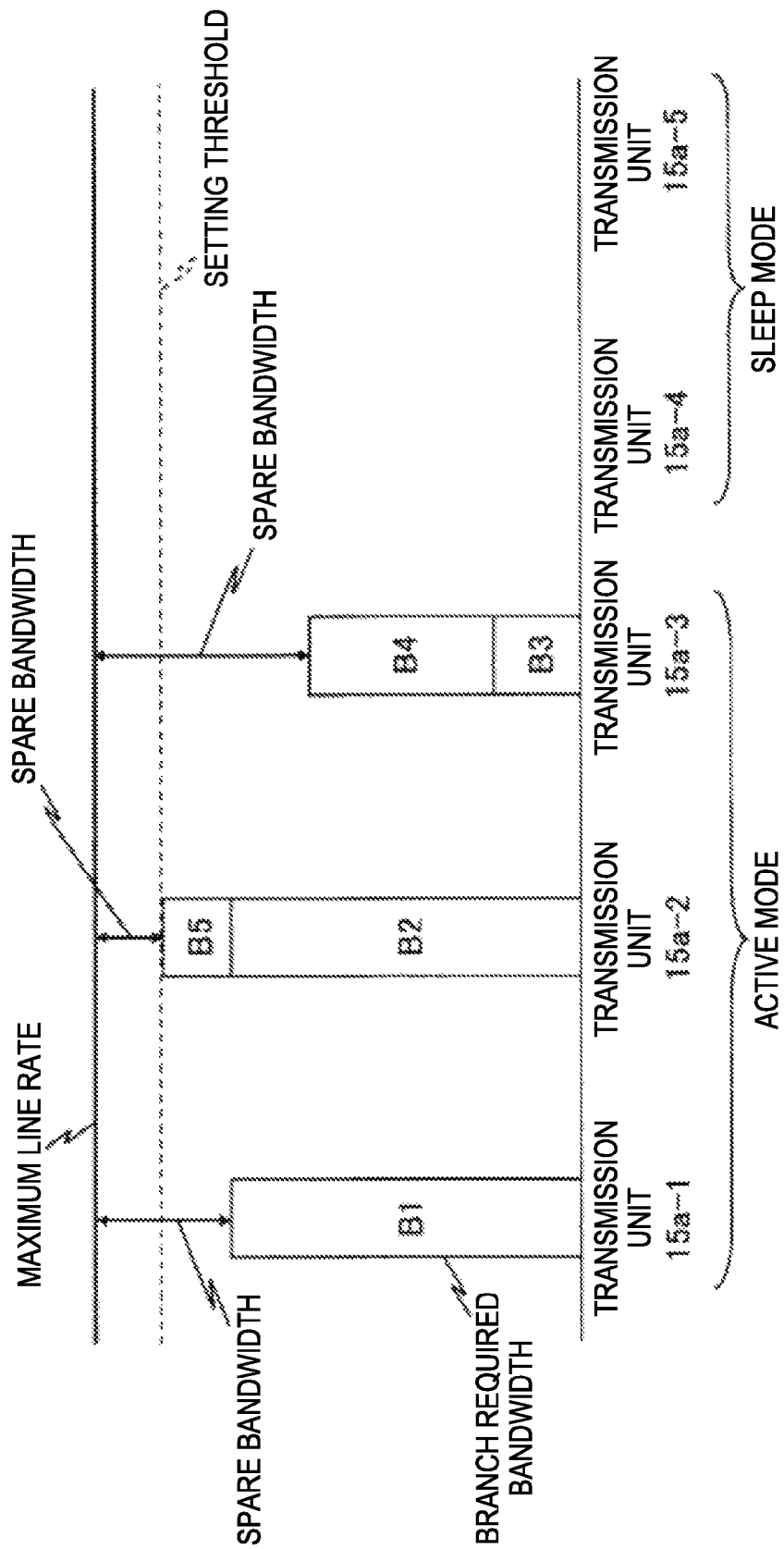
FIG. 5 is a diagram illustrating an example of a PON branch combination for respective transmission units.

FIG. 5 illustrates an example of a PON branch combination for transmission units 15a-1 to 15a-5. In the example illustrated in FIG. 5, the PON branch B-1 is allocated to the transmission unit 15a-1 as one PON branch group, the PON branches B-2 and B-5 are together allocated to the transmission unit 15a-2 as one PON branch group, and the PON branches B-3 and B-4 are together allocated to the transmission unit 15a-3 as one PON branch group. For example, regarding the transmission unit 15a-2, the total value of the branch required bandwidth for the PON branch B-2 and the branch required bandwidth for the PON branch B-5 is equal to or less than the setting threshold, so that there is spare bandwidth with respect to the maximum line rate. Similarly, regarding the transmission units 15a-1 and 15a-3 too, there is spare bandwidth with respect to the maximum line rate. Consequently, insufficient bandwidth is less likely to occur even if the respective branch required bandwidths increase after combination determination. Note that the setting threshold is set as a smaller value than the maximum line rate. The transmission units 15a-4 and 15a-5, which have not been allocated with a PON branch, can be set to sleep mode. The combination change unit 13d issues a combination notification indicating this combination to the PON MAC 14.

A transmission wavelength designation unit 13e designates the transmission wavelength of each time slot (each piece of data) for the transmission units 15a-1 to 15a-N based on a notification regarding the configuration of the data allocation to each time slot from the PON MAC 14 (hereinafter referred to as "time slot configuration notification").

Figure 6:
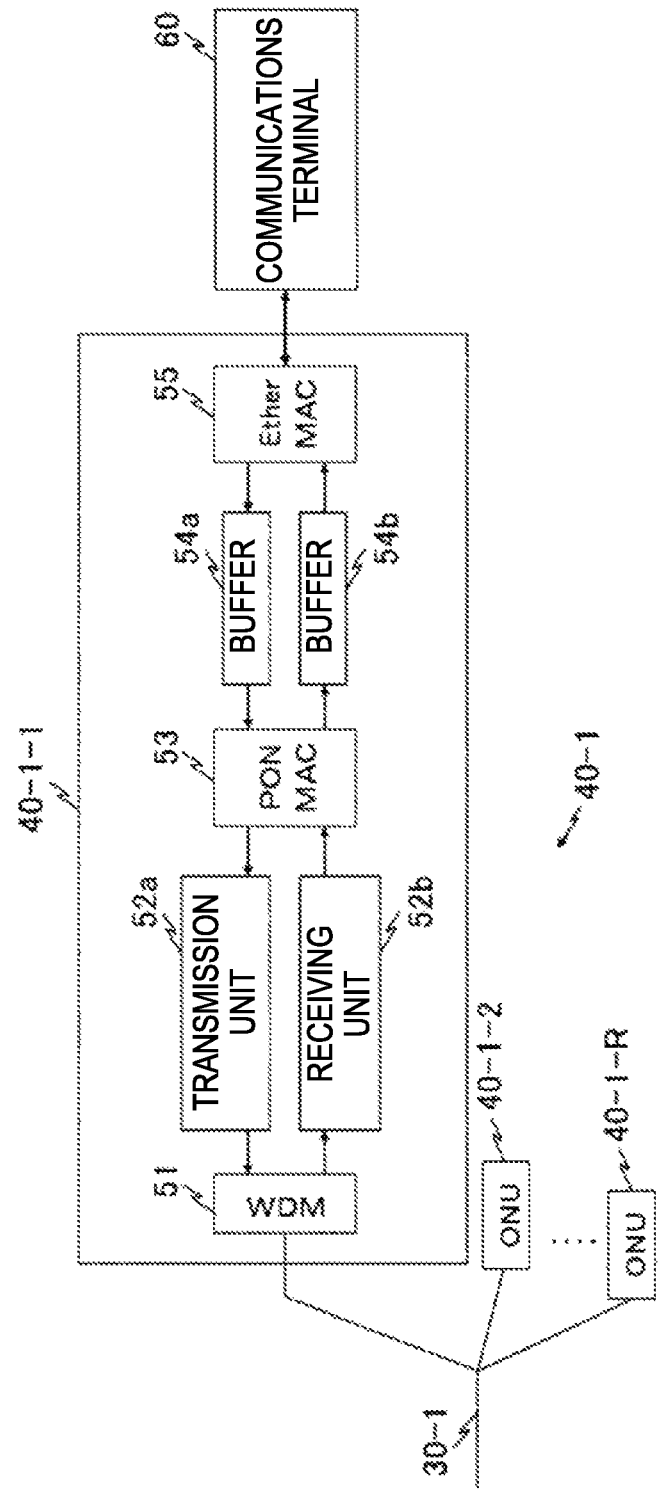
FIG. 6 is a block diagram illustrating an ONU configuration along with a communications terminal.

FIG. 6 illustrates the configuration of ONU 40-1-1 included in the ONU group 40-1 along with a communications terminal 60.

A WDM 51 supplies the downlink data that has arrived via the optical transmission path 30-1 to a receiving unit 52b. During this operation, the WDM 51 performs wavelength selection on the downlink data that has arrived via the optical transmission path 30-1 to prevent the returning light of the data transmitted by the transmission unit 52a from having an effect on the receiving unit 52b.

The receiving unit 52b receives the wavelength-selected downlink data, and photoelectrically converts that data. The receiving unit 52b is configured from a photodiode, for example.

A PON MAC 53 performs predetermined data processing, such as reading instruction information from the photoelectrically converted data and converting the downlink data into an Ethernet® frame format from an EPON system frame format.

A buffer 54b temporarily accumulates the processed data.

An Ether MAC 55 transmits the data accumulated in the buffer 54b to the communications terminal 60.

The configuration of the uplink direction units, such as a transmission unit 52a and a buffer 54a, will be described in the second embodiment.

Each of the ONU 40-1-2 to ONU-1-R have the same configuration as the ONU 40-1-1. Further, each of the ONU groups 40-2 to ONU-M have the same configuration as the ONU group 40-1.

Figure 7:
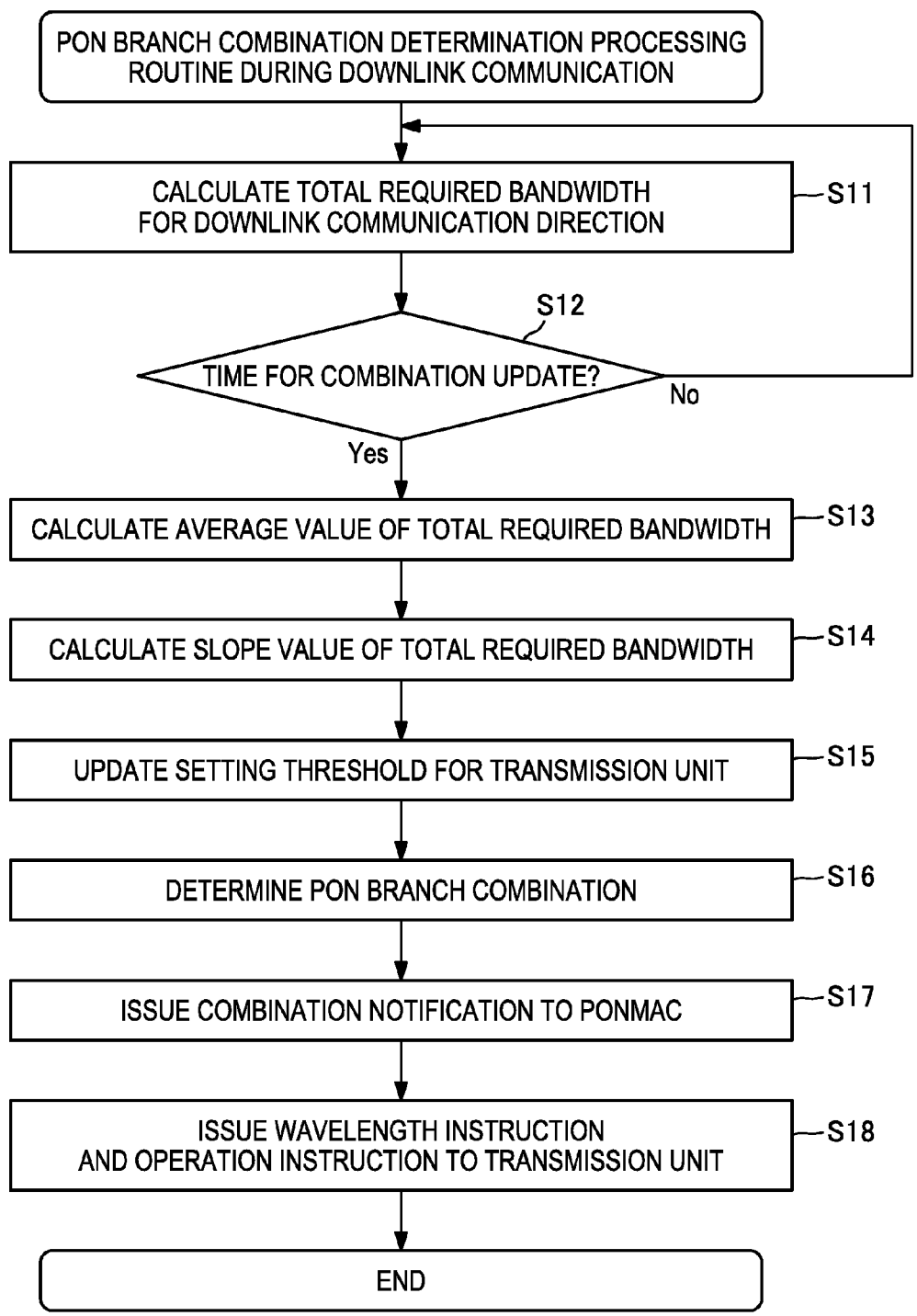
FIG. 7 is a flowchart illustrating a PON branch combination change processing routine performed by a management unit during downlink communication.

The PON branch combination change processing performed by the management unit 13 during downlink communication will now be described with reference to FIG. 7. The exchange device 10 starts communication between the ONU groups 40-1 to 40-M based on a typical communication establishment process on an EPON.

After communication has started, the required bandwidth calculation unit 13a starts monitoring the amount of downlink traffic passing through each ONU at the L2 switch 11, or the amount of downlink communication traffic of each ONU accumulated in the buffers 12a-1 to 12a-N. Then, the required bandwidth calculation unit 13a, periodically or intermittently, calculates the total required bandwidth by adding the required bandwidth for all ONUs (ONU required bandwidth) (step S11). The total required bandwidth is stored in the storage unit 13b.

The threshold update unit 13c updates the setting threshold each time an update time arrives (step S12).

First, using the total required bandwidth stored in the storage unit 13b, the threshold update unit 13c calculates the average value (average required bandwidth) of the total required bandwidth included in the period between the previous update time and the current update time (step S13).

Next, the threshold update unit 13c calculates a slope value (step S14). In this operation, the threshold update unit 13c compares the current average required bandwidth with the immediately prior average required bandwidth, and calculates the slope value based on the change from the immediately prior average required bandwidth. The slope value calculated by the threshold update unit 13c may be, for example, +0.125.

Next, the threshold update unit 13c updates the setting threshold based on the slope value (step S15). For example, if the slope value is +0.125 and the threshold update unit 13c stores the bandwidth threshold table illustrated in FIG. 3, the threshold update unit 13c decreases the setting threshold by 1 Gbps.

After the threshold update unit 13c has updated the setting threshold, the combination change unit 13d determines the PON branch combination (step S16). In this operation, the combination change unit 13d determines the combination so that the total of the required bandwidth of each PON branch (branch required bandwidth) does not exceed the setting threshold. Note that the branch required bandwidth is obtained by adding each of the ONU required bandwidths of the ONU belonging to one PON branch.

As illustrated in FIG. 5 for example, the combination change unit 13d allocates the PON branch B-1 to the transmission unit 15a-1 as one PON branch group, the PON branches B-2 and B-5 together to the transmission unit 15a-2 as one PON branch group, and the PON branches B-3 and B-4 together to the transmission unit 15a-3 as one PON branch group.

Next, the combination change unit 13d issues a combination notification indicating this combination to the PON MAC 14 (step S17). The PON MAC 14 fits the data for each ONU in a time slot based on the combination indicated by the combination notification, and supplies that information to the transmission units 15a-1 to 15a-N. The PON MAC 14 issues a notification about the information indicating the time slot configuration in which the respective data has been allocated (time slot configuration notification) to the transmission wavelength designation unit 13e.

The transmission wavelength designation unit 13e issues a transmission wavelength designation for the data allocated to each time slot to the transmission units 15a-1 to 15a-N based on the time slot configuration notification (step S18). The transmission units 15a-1 to 15a-N transmits each piece of data using a carrier wave of the transmission wavelength designated by the transmission wavelength designation. The AWG 16 allocates the data to one of the optical transmission paths 30-1 to 30-M based on the wavelength of the respective piece of data.

Further, the combination change unit 13d sets the receiving units among transmission units 15a-1 to 15a-N that, based on the combination result, have not been allocated with a PON branch to sleep mode (step S18).

Figure 8:
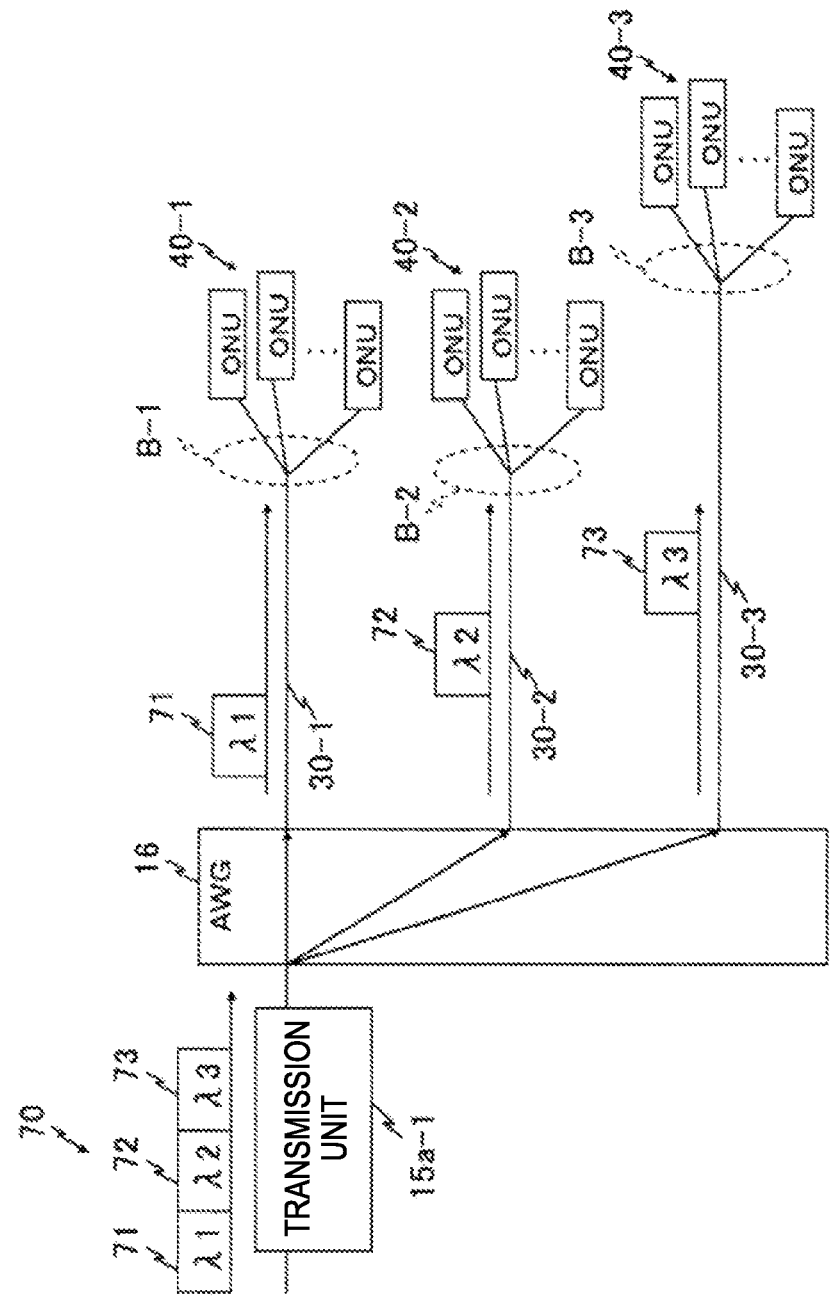
FIG. 8 is a diagram illustrating how wavelength routing is performed by an AWG during downlink communication.

FIG. 8 illustrates how wavelength routing is performed by the AWG 16 during downlink communication. FIG. 8 illustrates an example in which the transmission unit 15a-1 transmits a data group 70 in which data 71 with a wavelength $\lambda 1$, data 72 with a wavelength $\lambda 2$, and data 73 with a wavelength $\lambda 3$ are allocated to time slots in a time series manner. The AWG 16 transmits the data 71 with a wavelength $\lambda 1$ to the optical transmission path 30-1, the data 72 with a wavelength $\lambda 1$ to the optical transmission path 30-2, and the data 73 with a wavelength $\lambda 3$ to the optical transmission path 30-3. The data 71 is received by the ONU group 40-1 belonging to the PON branch B-1, the data 72 is received by the ONU group 40-2 belonging to the PON branch B-2, and the data 73 is received by the ONU group 40-3 belonging to the PON branch B-3. Although FIG. 8 illustrates an example of three wavelengths, for cases of four or more wavelengths too, the AWG 16 similarly determines the transmission destination of the data based on the wavelength.

Figure 9:
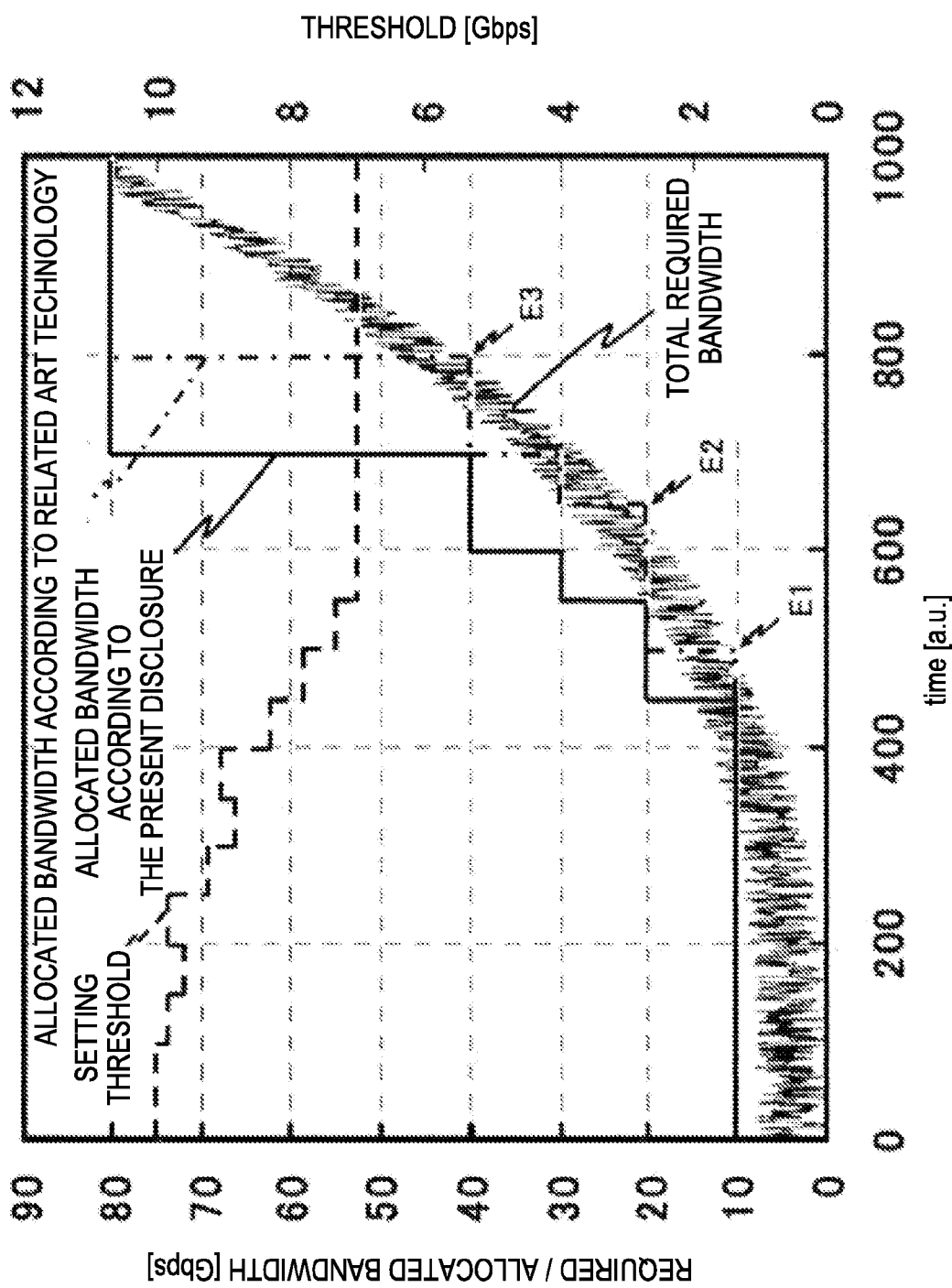
FIG. 9 is a graph illustrating changes in the required bandwidth, the setting threshold, the allocated bandwidth according to a related art technology, and the allocated bandwidth according to the present disclosure.

FIG. 9 illustrates the required bandwidth, the setting threshold, and the results of a simulation of allocated bandwidth according to the related art technology and the present disclosure. The results are based on a simulation in which the data rate for transmission units 15a to 15-8 is 10 Gbps, respectively, the number of branches (number of transmission units) is set at eight, the maximum value for the setting threshold is set at 10 Gbps, the minimum value for the setting threshold is set at 7 Gbps, and the combination update interval is set as 50 time [a.u.].

The horizontal axis represents time, the first vertical axis represents the total required bandwidth and the allocated bandwidth, and the second vertical axis represents the setting threshold. The total required bandwidth is the total value of the required bandwidth for all of the PON branches. This total value is obtained by simply adding the required bandwidth of each PON branch equally.

The allocated bandwidth is a value obtained by multiplying the number of active transmission units among the transmission units 15a-1 to 15a-N (i.e., excluding those in sleep mode) by the data rate. Based on the above conditions, the maximum value of the allocated bandwidth is 80 Gbps. If the allocated band is 40 Gbps, the PON branches are divided into four groups, so that four transmission units will be operating.

As illustrated in FIG. 9, the allocated bandwidth according to the present disclosure decreases in a stepwise manner from 10 Gbps to 7 Gbps with the increase in the total required bandwidth. The allocated bandwidth varies based on the variation in the total required bandwidth. For example, if the total required bandwidth sharply increases, the amount of decrease in the allocated bandwidth will also be relatively large. The allocated bandwidth increases in a stepwise manner, ultimately reaching 80 Gbps. This indicates that the setting threshold is decreased, and the number of PON branch combinations for one transmission device is limited. Due to the limit on the number of combinations, spare bandwidth can be ensured.

The "allocated bandwidth according to the related art method", which is the target of comparison, is a result obtained when the setting threshold is a fixed value of 10 Gbps. Ten Gbps is the maximum data rate of the transmission units. For the related art method, there is a plurality of places (reference symbols E1, E2, and E3) where the allocated bandwidth is below the total required bandwidth. This shows that the allocated bandwidth cannot keep up with the sudden increase in the total required bandwidth, indicating insufficient bandwidth.

Under the above conditions, the calculated shortfall in bandwidth for the related art method is 568 Gbps. In contrast, for the present disclosure, the bandwidth shortfall total decreases to 77 Gbps.

As described above, in the exchange device 10 according to the present embodiment, the setting threshold increases/decreases based on the total required bandwidth for downlink communication. The setting threshold is set to a smaller value than the maximum line rate of the transmission units. Further, the combination of PON branches for each transmission unit is determined so that the total of the PON branch required bandwidth does not exceed the setting threshold. Based on such an operation, the total value of the branch required bandwidth for the respective transmission units is equal to or less than the setting threshold, so that each transmission unit has spare bandwidth with respect to the maximum data rate. Consequently, the advantageous effect that insufficient bandwidth is less likely to occur even if the branch required bandwidth increases in the period between determination of the PON branch combination and arrival of the next combination update time can be enjoyed.

Thus, in the exchange device 10 according to the present embodiment, when the total required bandwidth increases, spare bandwidth is ensured by decreasing the setting threshold and limiting the number of PON branches allocated to one transmission unit. On the other hand, when the total required bandwidth decreases, power consumption is decreased by decreasing the number of transmission units to which PON branches are allocated (i.e., increasing the number of transmission units that can be set to sleep mode) by increasing the setting threshold and increasing the number of PON branches allocated to one transmission unit.

<Second Embodiment>

An embodiment relating to uplink direction communication will now be described.

Similar to the first embodiment, the configuration of the ONU group 40-1 is illustrated in FIG. 6.

The Ether MAC 55 supplies input data from the communications terminal 60 to the buffer 54a.

The buffer 54a temporarily accumulates data supplied from the Ether MAC 55.

The PON MAC 53 performs predetermined data processing, such as converting the data accumulated in the buffer 54a from an Ethernet frame format into an EPON system frame format. Further, the PON MAC 53 periodically or intermittently grasps the current accumulated amount in the buffer 54a (hereinafter referred to as "buffer accumulated amount"), and transmits that buffer accumulated amount included in a report signal commonly used in an EPON system via the optical transmission path 30-1.

The transmission unit 52a transmits data that has been processed by the PON MAC 53 via the optical transmission path 30-1. During this operation, the transmission unit 52a transmits the data from the exchange device 10 using a carrier wave of a designated transmission wavelength. The transmission unit 52a is configured from a laser diode, for example.

The WDM 51 performs wavelength selection on the data arriving via the optical transmission path 30-1 to prevent the returning light of the data transmitted by the transmission unit 52a from having an effect on the receiving units 52b.

Each of the ONU 40-1-2 to ONU-1-R have the same configuration as the ONU 40-1-1. Further, each of the ONU groups 40-2 to ONU-M have the same configuration as the ONU group 40-1.

Similar to the first embodiment, the entire configuration of the exchange device 10 is illustrated in FIG. 1.

The AWG 16 has a plurality of input ports and a plurality of output ports associated with those input ports based on wavelength. The AWG 16 receives uplink data from the input ports via the optical transmission paths 30-1 to 30-M, and based on an AWG filter function, outputs the uplink data to one output port that is selected from among the plurality of output ports based on the transmission wavelength of that uplink data (i.e., is selection and transmission unit). Based on this operation, the plurality of series of time division multiplexed data that was obtained by performing time division multiplexing on each PON branch group is output from the AWG 16.

Figure 10:
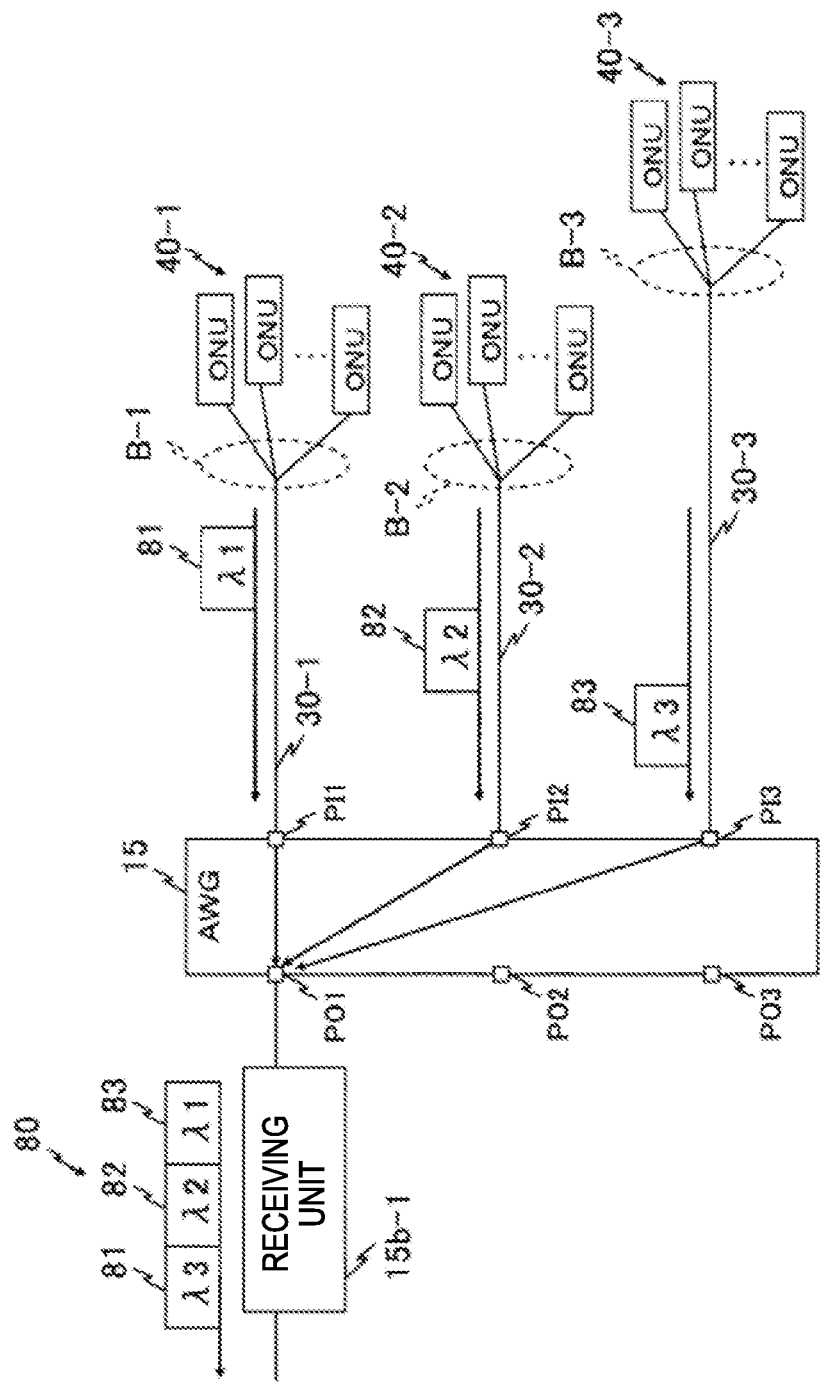
FIG. 10 is a diagram illustrating how wavelength routing is performed by an AWG during uplink communication.

FIG. 10 illustrates how wavelength routing is performed by the AWG 16 during uplink communication. FIG. 10 illustrates an example in which data 81 with a wavelength λ1 arrives via the optical transmission path 30-1, data 82 with a wavelength λ2 arrives via the optical transmission path 30-2, and data 83 with a wavelength λ3 arrives via the optical transmission path 30-3. In the example illustrated in FIG. 10, the PON branches B-1, B-2, and B-3 form one PON branch group. Data 81, 82, and 83 input into input ports PI1, PI2, and PI3 are time division multiplexed and then transmitted to one output port PO1. Further, the time division multiplexed data for the other PON branch groups (not illustrated) is also output from the AWG 16. Although FIG. 10 illustrates an example of three wavelengths, for cases of four or more wavelengths too, the AWG 16 similarly determines the output port (i.e., one of PO1 to PO3) to serve as the uplink data transmission destination based on the transmission wavelength of the uplink data.

WDM 15c-1 to 15c-N supply uplink data that has arrived via the optical transmission paths 30-1 to 30-M to the receiving units 15b-1 to 15b-N. During this operation, the WDM 15c-1 to 15c-N perform wavelength selection on the downlink data that has arrived via the optical transmission paths 30-1 to 30-M to prevent the returning light of the data transmitted by the transmission units 15a-1 to 15a-N from having an effect on receiving units 15b-1 to 15b-N.

Each of the receiving units 15b-1 to 15b-N receives one piece of time division multiplexed data for each PON branch group via one output port, and sends this received piece of data to the PON MAC 14. The receiving units 15b-1 to 15b-N are configured from a photodiode, for example.

The management unit 13 calculates the required bandwidth for each of the PON branches B-1 to B-M by setting the buffer accumulated amount for each ONU included in the report signal that has arrived via the optical transmission paths 30-1 to 30-M as a required bandwidth. Then, the management unit 13 groups the PON branches B-1 to B-M into a plurality of PON branch groups based on required bandwidth. The management unit 13 periodically or intermittently changes the combination of PON branches included in the PON branch groups (i.e., is combination change unit).

Further, the management unit 13 designates the transmission wavelength for each ONU group 40-1 to 40-M based on this combination. More specifically, the management unit 13 designates the transmission wavelength for each ONU so that each piece of uplink data from the ONU belonging to a given PON branch group is transmitted to one output port of the AWG 16 (i.e., is transmission wavelength designation unit). The transmission wavelength designation can also be performed using an expanded OAM signal used in a typical EPON system.

The PON MAC 14 separates the data forming the data group 80 from the receiving units 15b-1 to 15b-N for each transmission source ONU based on the content of the combination notification from the management unit 13.

The buffers 12a-1 to 12a-N accumulate the separated data for each transmission source ONU.

The L2 switch 11 multiplexes the data accumulated in the buffers 12a-1 to 12a-N, and transmits the multiplexed data to the communication network 20.

Figure 11:
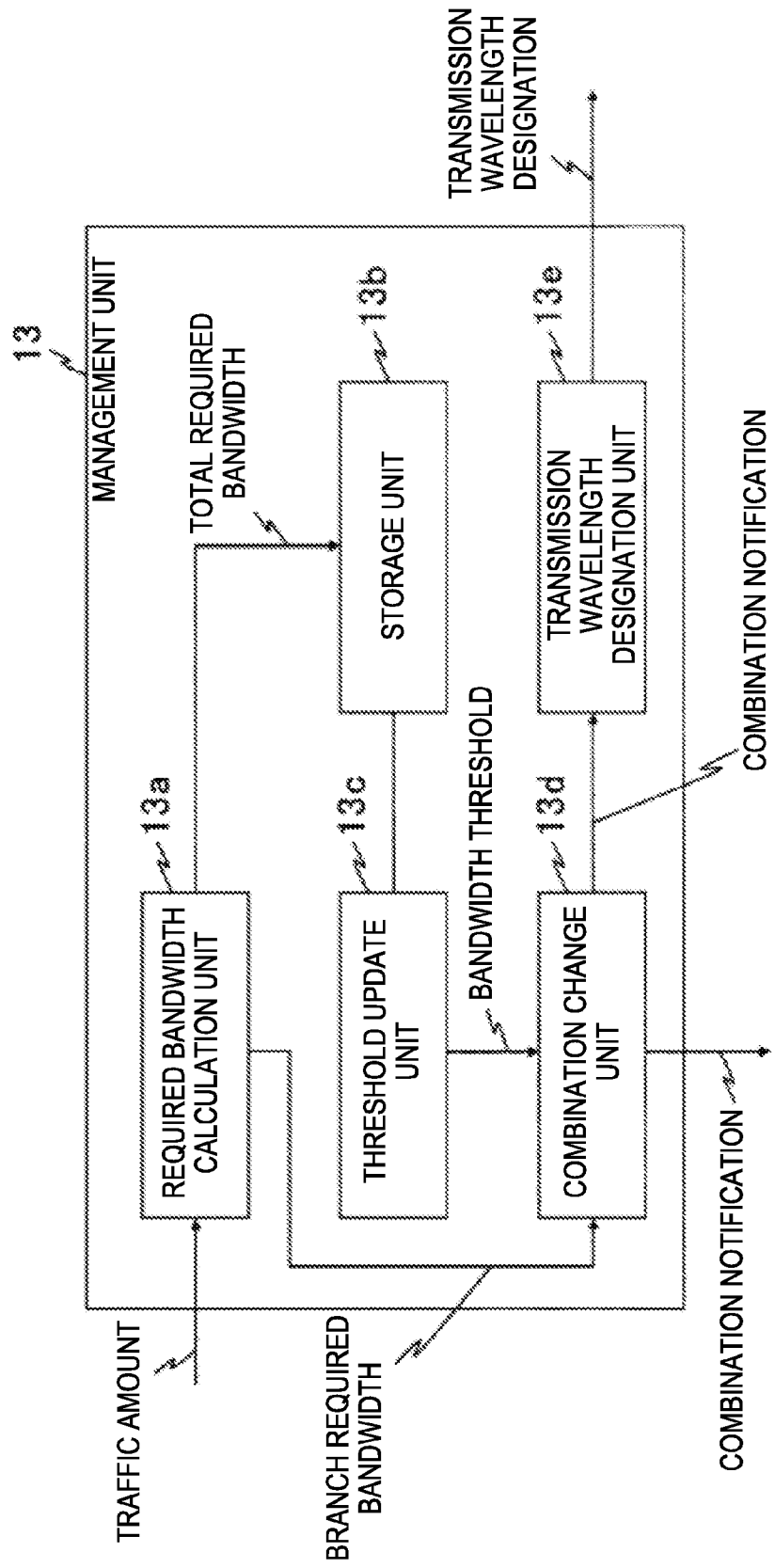
FIG. 11 is a block diagram illustrating a configuration of a management unit according to a second embodiment.

FIG. 11 illustrates a configuration of the management unit 13 according to the present embodiment.

The required bandwidth calculation unit 13a calculates the total required bandwidth of the uplink signal. The total required bandwidth of the uplink signal can be calculated by, for example, utilizing a report signal from the ONU groups 40-1 to 40-M (FIG. 1). The required bandwidth calculation unit 13a sets the buffer accumulation amount included in a report signal as the required bandwidth, and calculates the required bandwidth for each ONU (ONU required bandwidth) each time a report signal is received. Further, the required bandwidth calculation unit 13a calculates the total required bandwidth by adding the ONU required bandwidth for all of the ONUs. The total required bandwidth is calculated based on Equation 1 in the same manner as the first embodiment.

Further, the required bandwidth calculation unit 13a calculates the required bandwidth for each of the PON branches B-1 to B-M from the ONU required bandwidth (branch required bandwidth). The branch required bandwidth for a given PON branch can be obtained by adding the ONU required bandwidth for each ONU belonging to that PON branch.

The storage unit 13b stores the total required bandwidth that is periodically or intermittently calculated by the required bandwidth calculation unit 13a. Further, the storage unit 13b also stores the average required bandwidth calculated by a below-described threshold update unit 13c.

The threshold update unit 13c updates a setting threshold each time an update time arrives. The update times arrive at fixed update intervals. More specifically, the threshold update unit 13c calculates the average value (hereinafter referred to as "average required bandwidth") of the total required bandwidth included within an update interval (period between the previous update time to the current update time) using the total required bandwidth stored in the storage unit 13b. The calculated average required bandwidth is stored in the storage unit 13b. The average required bandwidth is calculated based on Equation 2.

Next, the threshold update unit 13c calculates a slope value. More specifically, the threshold update unit 13c compares the current average required bandwidth with the immediately prior average required bandwidth, and if the current average required bandwidth is greater denotes the value with a plus, if the current average required bandwidth is smaller denotes the value with a minus, and if the current average required bandwidth is the same denotes the value with a zero. Further, the threshold update unit 13c determines the amount of change in the current average required bandwidth from the immediately prior average required bandwidth (bandwidth change amount). The slope value is calculated based on Equation 3 in the same manner as the first embodiment.

Next, the threshold update unit 13c increases/decreases the setting threshold based on the slope value. More specifically, the threshold update unit 13c decreases the setting threshold if the slope value is positive, increases the setting threshold if the slope value is negative, and does not change the setting threshold if the slope value is zero. At this stage, the threshold update unit 13c changes the setting threshold by a larger amount the greater the bandwidth change amount is. The threshold update unit 13c stores the bandwidth threshold table illustrated in FIG. 3, for example. The amount of increase/decrease in the setting threshold is determined based on the association in the table between the slope values and the threshold increase/decrease amount. Similar to the first embodiment, variation in the setting uplink data is illustrated in FIG. 4.

After the setting threshold has been updated, a combination change unit 13d determines the PON branch combination so that the total of the branch required bandwidths does not exceed the setting threshold.

Figure 12:
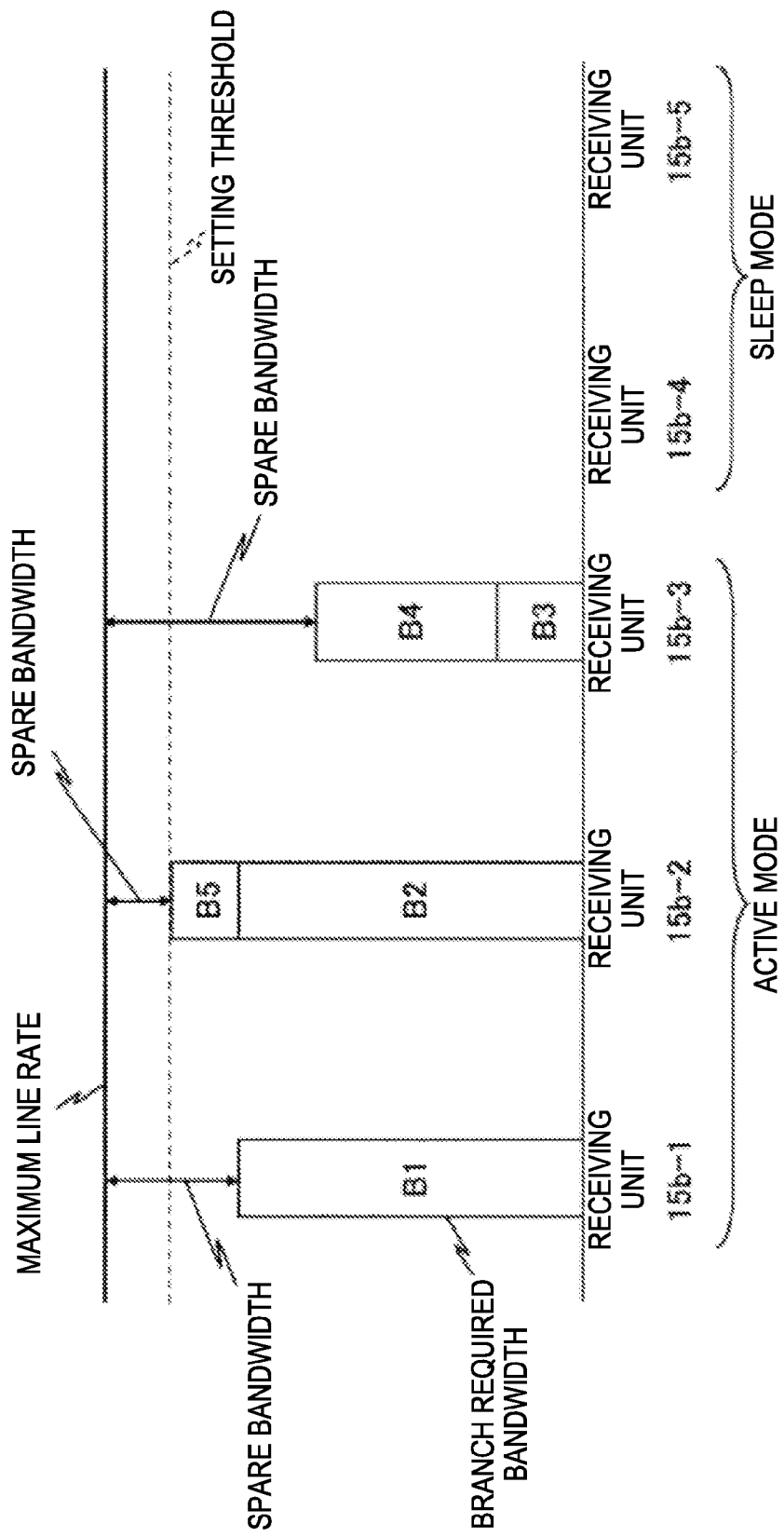
FIG. 12 is a diagram illustrating a relationship in a transmission unit between a PON branch combination and the spare bandwidth and maximum line rate.

FIG. 12 illustrates an example of a PON branch combination for transmission units 15a-1 to 15a-5. In the example illustrated in FIG. 12, the PON branch B-1 is allocated to the receiving unit 15b-1 as one PON branch group, the PON branches B-2 and B-5 are together allocated to the receiving unit 15b-2 as one PON branch group, and the PON branches B-3 and B-4 are together allocated to the receiving unit 15b-3 as one PON branch group. For example, regarding the receiving unit 15b-2, the total value of the branch required bandwidth for the PON branch B-2 and the branch required bandwidth for the PON branch B-5 is equal to or less than the setting threshold, so that there is spare bandwidth with respect to the maximum line rate. Similarly, regarding the receiving units 15b-1 and 15b-3 too, there is spare bandwidth with respect to the maximum line rate. Consequently, insufficient bandwidth is less likely to occur even if the respective branch required bandwidths increase after combination determination. Note that the setting threshold is set as a smaller value than the maximum line rate. The receiving units 15b-4 and 15b-5, which have not been allocated with a PON branch, can be set to sleep mode.

The transmission wavelength designation unit 13e determines the transmission wavelength for each ONU group 40-1 to 40-M based on the combination notification from the combination change unit 13d. More specifically, for one ONU group belonging to a PON branch allocated to one receiving unit by the combination change unit 13d, the transmission wavelength designation unit 13e designates one wavelength corresponding to that receiving unit as the transmission wavelength. The transmission wavelength designation can also be performed using an expanded OAM signal used in a typical EPON system.

As illustrated in FIG. 12, for example, the combination change unit 13d allocates the PON branch B-1 to the receiving unit 15b-1, the PON branches B-2 and B-5 to the receiving unit 15b-2, and the PON branches B-3 and B-4 to the receiving unit 15b-3. Further, for example, the combination change unit 13d has the wavelength correspondence table for the input ports and the output ports illustrated in FIG. 13. In this case, the transmission wavelength designation unit 13e designates the transmission wavelength $\lambda 1$ to the ONU group 40-1 belonging to the PON branch B-1. Further, the transmission wavelength designation unit 13e designates, for example, the transmission wavelength $\lambda 3$ to the ONU group 40-2 belonging to the PON branch B-2, and the transmission wavelength $\lambda 1$ to the ONU group 40-5 belonging to the PON branch B-5. In addition, the transmission wavelength designation unit 13e designates the transmission wavelength $\lambda 5$ to the ONU group 40-3 belonging to the PON branch B-3, and the transmission wavelength $\lambda 1$ to the ONU group 40-4 belonging to the PON branch B-4.

If data is transmitted using the carrier wave of the transmission wavelengths designated by the respective ONU groups 40-1 to 40-5, the AWG 16 allocates data to the receiving units 15b-1 to 15b-5 in the combination determined by the combination change unit 13d (e.g., as illustrated in FIG. 12).

Figure 14:
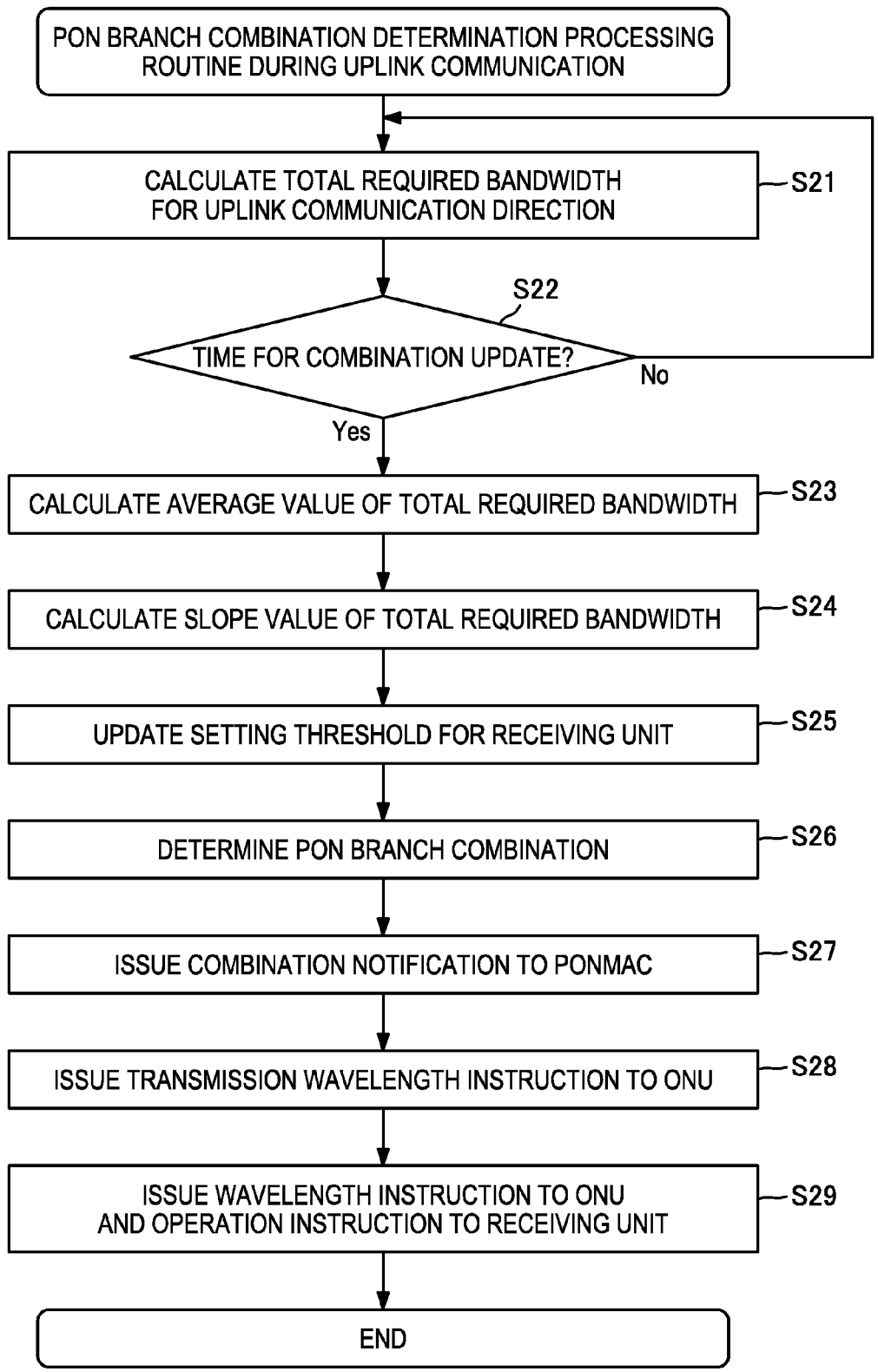
FIG. 14 is a flowchart illustrating a PON branch combination change processing routine performed by a management unit during uplink communication.

The PON branch combination change processing performed by the management unit 13 during downlink will now be described with reference to FIG. 14. The exchange device 10 starts communication between the ONU groups 40-1 to 40-M based on a typical communication establishment process on an EPON.

After communication has started, the required bandwidth calculation unit 13a calculates the required bandwidth (ONU required bandwidth) for each ONU using the buffer accumulated amount for each of the ONU groups 40-1 to 40-M, which is included in a report signal that periodically or intermittently arrives via the optical transmission paths 30-1 to 30-M, as a required bandwidth. Further, the required bandwidth calculation unit 13a calculates the total required bandwidth by adding the ONU required bandwidth for all ONUs (step S21). The total required bandwidth is stored in the storage unit 13b.

The threshold update unit 13c updates the setting threshold each time an update time arrives (step S22).

First, using the total required bandwidth stored in the storage unit 13b, the threshold update unit 13c calculates the average value (average required bandwidth) of the total required bandwidth included in the period between the previous update time and the current update time (step S23).

Next, the threshold update unit 13c calculates a slope value (step S24). In this operation, the threshold update unit 13c compares the current average required bandwidth with the immediately prior average required bandwidth, and calculates the slope value based on the change from the immediately prior average required bandwidth. The slope value calculated by the threshold update unit 13c may be, for example, +0.125.

Next, the threshold update unit 13c updates the setting threshold based on the slope value (step S25). For example, if the slope value is +0.125 and the threshold update unit 13c stores the bandwidth threshold table illustrated in FIG. 3, the threshold update unit 13c decreases the setting threshold by 1 Gbps.

After the threshold update unit 13c has updated the setting threshold, the combination change unit 13d determines the PON branch combination (step S26). In this operation, the combination change unit 13d determines the combination so that the total of the required bandwidth of each PON branch (branch required bandwidth) does not exceed the setting threshold. Note that the branch required bandwidth is obtained by adding each of the ONU required bandwidths of the ONU belonging to one PON branch.

As illustrated in FIG. 5 for example, the combination change unit 13d allocates the PON branch B-1 to the transmission unit 15a-1 as one PON branch group, the PON branches B-2 and B-5 together to the transmission unit 15a-2 as one PON branch group, and the PON branches B-3 and B-4 together to the transmission unit 15a-3 as one PON branch group. Next, the combination change unit 13d issues a combination notification indicating this combination to the PON MAC 14 (step S27). Further, the combination change unit 13d also issues a combination notification indicating this combination to the transmission wavelength designation unit 13e.

The transmission wavelength designation unit 13e determines the transmission wavelength for each ONU group 40-1 to 40-M based on the combination notification from the combination change unit 13d, and designates this transmission wavelength for each ONU group 40-1 to 40-M via the optical transmission paths 30-1 to 30-M (step S28). During this operation, the transmission wavelength designation unit 13e designates the transmission wavelength for each of the ONUs so that each piece of uplink data from the ONU belonging to a given PON branch group is transmitted to one output port of the AWG 16. For example, if the combination is determined as illustrated in FIG. 12, and the combination change unit 13d has the wavelength correspondence table illustrated in FIG. 13, the transmission wavelength designation unit 13e designates, for example, the transmission wavelengths $\lambda 1$, $\lambda 2$, $\lambda 3$, $\lambda 4$, and $\lambda 5$, respectively, to the ONU groups 40-1, 40-2, 40-3, 40-4, and 40-5.

The combination change unit 13d sets receiving units among receiving units 15b-1 to 15b-N that, based on the combination results, have not been allocated with a PON branch to sleep mode (step S29).

Each ONU belonging to the ONU groups 40-1 to 40-M transmits the uplink data to the exchange device 10 using a carrier wave of the designated transmission wavelength. The AWG 16 supplies the respective uplink data to the receiving units 15b-1 to 15b-N based on that transmission wavelength.

As described above, in the exchange device 10 according to the present embodiment, the setting threshold increases/decreases based on the total required bandwidth for uplink communication. The setting threshold is set to a smaller value than the maximum line rate of the receiving units. Further, the combination of PON branches for each receiving unit is determined so that the total of the PON branch required bandwidth does not exceed the setting threshold. Based on such an operation, the total value of the branch required bandwidth for the respective receiving units is equal to or less than the setting threshold, so that each receiving unit has spare bandwidth with respect to the maximum data rate. Consequently, the advantageous effect that insufficient bandwidth is less likely to occur even when the branch required bandwidth increases in the period between determination of the PON branch combination and arrival of the next combination update time can be enjoyed.

Thus, in the exchange device 10 according to the present embodiment, when the total required bandwidth increases, spare bandwidth is ensured by decreasing the setting threshold and limiting the number of PON branches allocated to one receiving unit. On the other hand, when the total required bandwidth decreases, power consumption is decreased by decreasing the number of receiving units to which PON branches are allocated (i.e., increasing the number of receiving units that can be set to sleep mode) by increasing the setting threshold and increasing the number of PON branches allocated to one receiving unit.

<First Modified Example>

A modified example of the operation to determine the combination of the PON branches performed by the management unit 13 during downlink communication will now be described.

The required bandwidth calculation unit 13a monitors the amount of traffic passing through each ONU at the L2 switch 11 or the amount of traffic of each ONU accumulated in the buffers 12a-1 to 12a-N, and periodically or intermittently calculates the required bandwidth of each ONU (hereinafter referred to as an "ONU required bandwidth").

Further, the required bandwidth calculation unit 13a calculates the required bandwidth for each of the PON branches B-1 to B-M from the ONU required bandwidth (branch required bandwidth). The branch required bandwidth for a given PON branch is obtained by adding the ONU required bandwidth for each ONU belonging to that one PON branch.

If the ONU required bandwidth is considered as traffic(t,n) (wherein t represents the minimum time unit and n represents the total number of ONUs), the branch required bandwidth branch_traffic (t,m) (wherein m represents the total number of PON branches) can be calculated based on the following equation.

[Math. 4]

$$\text{branch\_traffic}(t, m) = \sum_{n} \text{traffic}(t, n) \quad \text{(Equation 4)}$$

The storage unit 13b stores the branch required bandwidth that is periodically or intermittently calculated by the required bandwidth calculation unit 13a. Further, the storage unit 13b also stores the average required bandwidth calculated by the below-described threshold update unit 13c.

An added bandwidth determination unit 13f determines an added bandwidth for each PON branch each time an update time arrives. The update times arrive at fixed update intervals. More specifically, the added bandwidth determination unit 13f calculates for each PON branch the average value (branch average required bandwidth) of the branch required bandwidth included within an update interval (period between the previous update time to the current update time) using the branch required bandwidth stored in the storage unit 13b. The calculated branch average required bandwidth is stored in the storage unit 13b.

If the update interval is considered as T, the branch required bandwidth bave_traffic (T) can be calculated based on the following equation.

[Math. 5]

$$\text{bave\_traffic}(T, m) = \left\{ \sum_{t} \text{branch\_traffic}(t, m) \right\} / T \quad \text{(Equation 5)}$$

Next, the added bandwidth determination unit 13f calculates a slope value (hereinafter referred to as "branch slope value") for each PON branch. More specifically, the added bandwidth determination unit 13f compares the current average required bandwidth with the immediately prior average required bandwidth, and if the current average required bandwidth is greater denotes the value with a plus, if the current average required bandwidth is smaller denotes the value with a minus, and if the current average required bandwidth is the same denotes the value with a zero. Further, the added bandwidth determination unit 13f determines the amount of bandwidth change in the current average required bandwidth from the immediately prior average required bandwidth.

If the line rate of each of the transmission units 15a-1 to 15a-N is considered as RL, and the total number of PON branches as Mmax, the branch slope value bslop(T) can be calculated based on the following equation.

[Math. 6]

$$b\text{slop}(T,m) = \{b\text{ave\_traffic}(T,m) - b\text{ave\_traffic}(T-1,m)\} / (RL \times M\text{max}) \quad \text{(Equation 6)}$$

For example, if RL=10 Gbps, Mmax=8, and the current average required bandwidth is greater than the immediately prior average required bandwidth by 10 Gbps, the branch slope value is 0.125.

Next, the added bandwidth determination unit 13f determines an added bandwidth for each PON branch based on the branch slope value.

Figure 16:
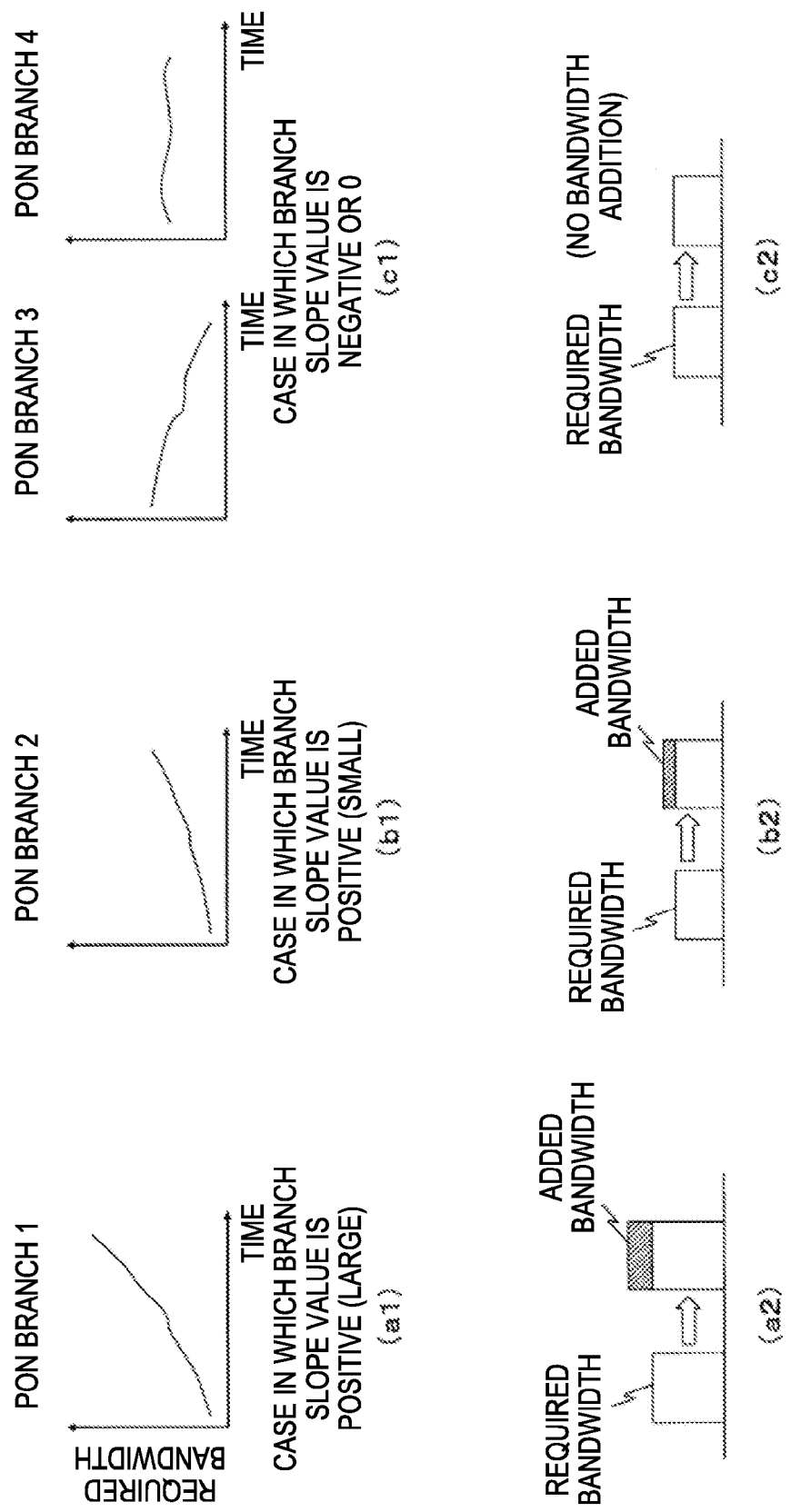
FIG. 16 illustrates a relationship between branch slope value and added bandwidth according to a modified example.

FIG. 16 illustrates the relationship between a branch slope value and an added bandwidth. If the branch slope value for a given PON branch is positive (FIGS. 16(a1) and 16(a2)), the added bandwidth determination unit 13f adds an added bandwidth to the current required bandwidth of that PON branch. At this stage, the added bandwidth determination unit 13f increases the size of the added bandwidth the greater the branch slope value is. For example, if the branch slope value is +0.125, the added bandwidth determination unit 13f sets the added bandwidth as 1 Gbps, while if the branch slope value is +0.5, the added bandwidth determination unit 13f sets the added bandwidth as 5 Gbps. Further, if the branch slope value is negative or zero (FIG. 16(c1)), the added bandwidth determination unit 13f does not add an added bandwidth to the current required bandwidth of that PON branch (FIG. 16(c2)).

The added bandwidth determination unit 13f stores the added bandwidth table illustrated in FIG. 17, for example. In the added bandwidth table, branch slope values are associated with added bandwidth amounts. The added bandwidth determination unit 13f determines the added bandwidth amount based on this association. For example, if the branch slope value is +0.250, the added bandwidth amount is decreased by 3 Gbps, and if the branch slope value is −0.250, the added bandwidth amount is increased by 0 Gbps. In the following, a bandwidth in which a branch required bandwidth and an added bandwidth have been combined for one PON branch will be referred to as a confirmed bandwidth for that one PON branch.

After the added bandwidth amount has been determined, the combination change unit 13d determines the PON branch combination so that the total of the confirmed bandwidths does not exceed the maximum data rate.

Figure 18:
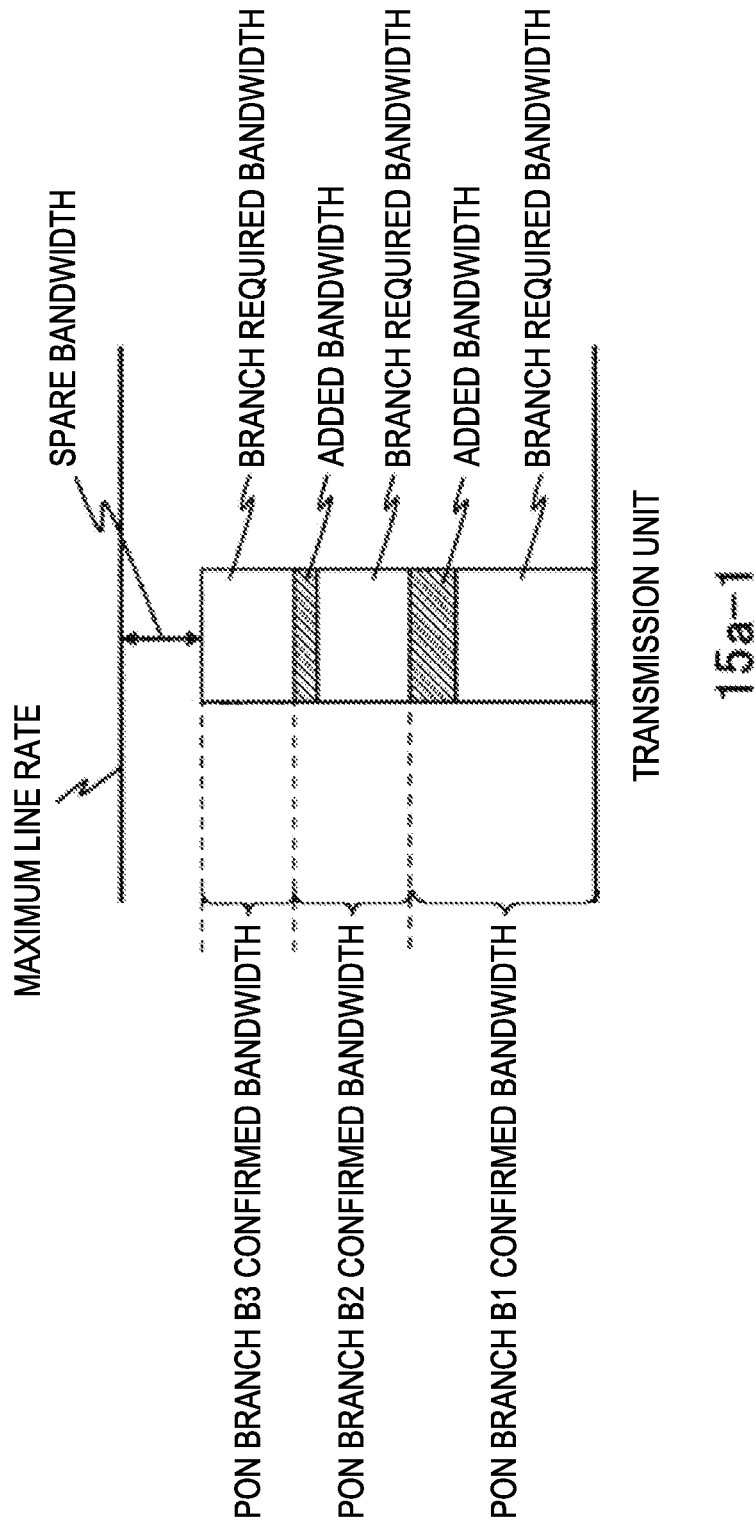
FIG. 18 is a diagram illustrating an example of a PON branch combination for one transmission unit according to a modified example.

FIG. 18 illustrates an example of a PON branch combination for the transmission unit 15a-1. PON branches B-1, B-2, and B-3 form one PON branch group. The confirmed bandwidth total of these PON branches is smaller than the maximum data rate, so that spare bandwidth is ensured. Further, an added bandwidth amount for each of the PON branches B-1 and B-2 is also ensured as spare bandwidth. For example, when a required bandwidth is added to the PON branch B-1, the added amount of the required bandwidth can be met by the added bandwidth amount for the PON branch B-1. Consequently, insufficient bandwidth is less likely to occur even if the respective branch required bandwidths increase after combination determination. Further, since the added bandwidth is determined based on the branch slope value of each PON branch, the PON branch combination can be determined so that there is little excess or shortage of spare bandwidth. Note that the transmission units that have not been allocated with a PON branch, can be set to sleep mode. The combination change unit 13d issues a combination notification indicating this combination to the PON MAC 14.

The transmission wavelength designation unit 13e designates the transmission wavelength of each time slot (each piece of data) for the transmission units 15a-1 to 15a-N based on a notification regarding the configuration of the data allocation to each time slot from the PON MAC 14 (time slot configuration notification).

Figure 19:
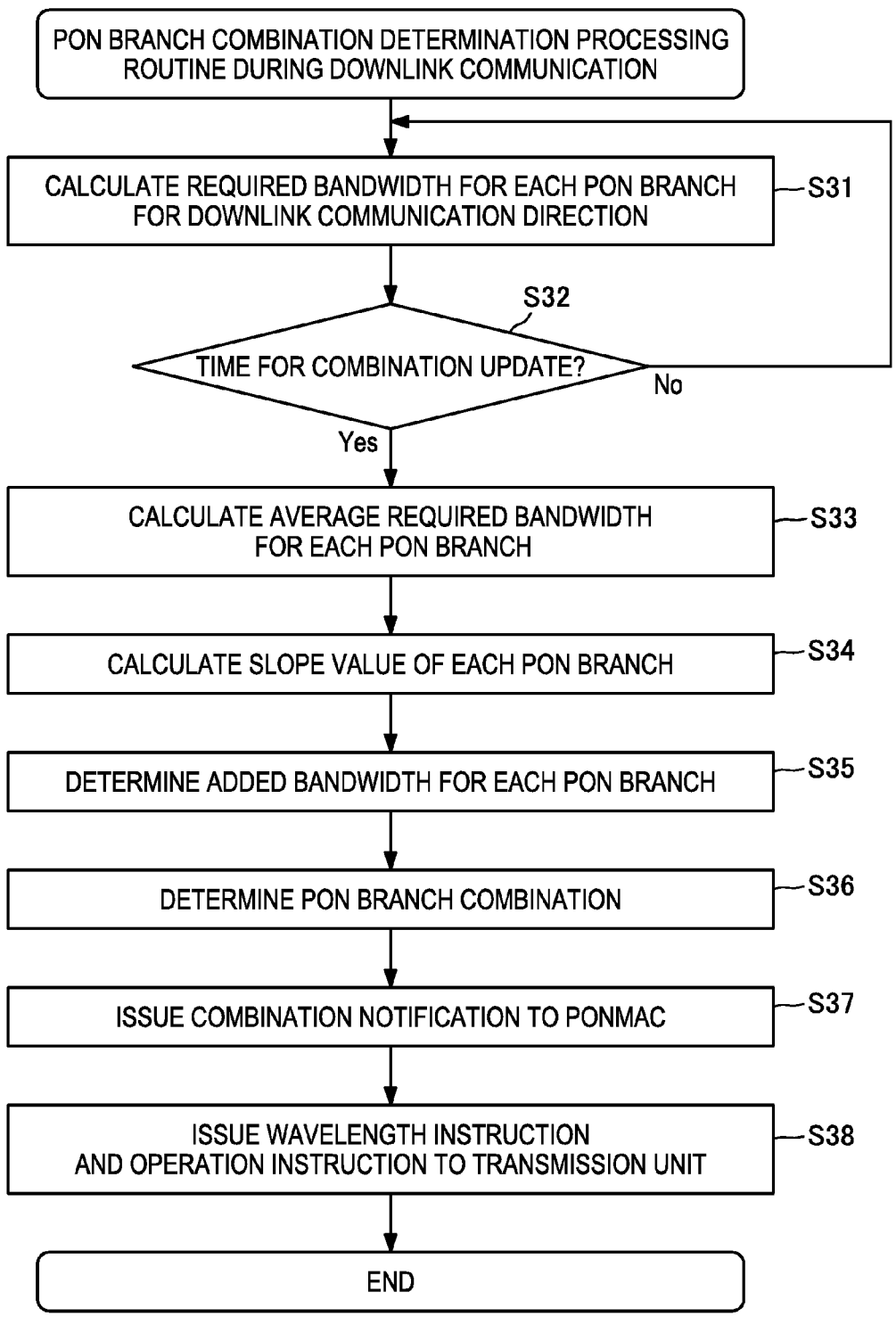
FIG. 19 is a flowchart illustrating a PON branch combination change processing routine performed during downlink communication according to a modified example.

The PON branch combination determination processing performed by the management unit 13 during downlink communication will now be described with reference to FIG. 19. The exchange device 10 starts communication between the ONU groups 40-1 to 40-M based on a typical communication establishment process on an EPON.

After communication has started, the required bandwidth calculation unit 13a starts monitoring the amount of downlink traffic passing through each ONU at the L2 switch 11, or the amount of downlink communication traffic of each ONU accumulated in the buffers 12a-1 to 12a-N. Then, the required bandwidth calculation unit 13a, periodically or intermittently, calculates the required bandwidth (branch required bandwidth) of each PON branch (step S31). The branch total required bandwidth is stored in the storage unit 13b.

The added bandwidth determination unit 13f determines the added bandwidth of each PON branch each time an update time arrives (step S32).

First, using the branch required bandwidth stored in the storage unit 13b, the added bandwidth determination unit 13f calculates the average value (branch average required bandwidth) of the branch required bandwidth of each PON branch included in the period between the previous update time and the current update time (step S33).

Next, the added bandwidth determination unit 13f calculates the branch slope value of each PON branch (step S34). In this operation, the added bandwidth determination unit 13f compares the current branch average required bandwidth with the immediately prior branch average required bandwidth for a given PON branch, and calculates the branch slope value for that one PON branch based on the amount of change from the immediately prior branch average required bandwidth. The branch slope value calculated by the added bandwidth determination unit 13f may be, for example, +0.125.

Next, the added bandwidth determination unit 13f determines the added bandwidth for each PON branch based on the branch slope value (step S35). For example, if the slope value is +0.125 and the added bandwidth determination unit 13f stores the added bandwidth table illustrated in FIG. 17, the added bandwidth determination unit 13f sets the added bandwidth at 1 Gbps.

After the added bandwidth determination unit 13f has determined the added bandwidth, the added bandwidth determination unit 13f determines the PON branch combination (step S36). In this operation, the combination change unit 13d determines the combination as illustrated in FIG. 18, for example, so that the total of the confirmed bandwidths for the respective PON branches (total of the branch required bandwidth and the added bandwidth) does not exceed the setting threshold.

Next, the combination change unit 13d issues a combination notification indicating this combination to the PON MAC 14 (step S37). The PON MAC 14 fits the data for each ONU in a time slot based on the combination indicated by the combination notification, and supplies that information to the transmission units 15a-1 to 15a-N. The PON MAC 14 issues a notification about the information indicating the time slot configuration in which the respective data has been allocated (time slot configuration notification) to the transmission wavelength designation unit 13e.

The transmission wavelength designation unit 13e issues a transmission wavelength designation for the data allocated to each time slot to the transmission units 15a-1 to 15a-N based on the time slot configuration notification (step S38). The transmission units 15a-1 to 15a-N transmits each piece of data using a carrier wave of the transmission wavelength designated by the transmission wavelength designation. The AWG 16 allocates the data to one of the optical transmission paths 30-1 to 30-M based on the wavelength of the respective piece of data.

Further, the combination change unit 13d sets the receiving units among transmission units 15a-1 to 15a-N that, based on the combination result, have not been allocated with a PON branch to sleep mode (step S38).

As described above, in the exchange device 10 according to the present embodiment, an added bandwidth is determined based on the required bandwidth for downlink communication for each PON branch. The total of the required bandwidth and the added bandwidth is set as a confirmed bandwidth, and the PON branch combination for each transmission unit is determined so that the total of the confirmed bandwidths does not exceed the maximum data rate of the transmission unit. Based on such an operation, the total value of the branch required bandwidths for the respective transmission units is less than the maximum data rate, so that each transmission unit has spare bandwidth with respect to the maximum data rate. Consequently, the advantageous effect that insufficient bandwidth is less likely to occur even if the branch required bandwidth increases in the period between determination of the PON branch combination and arrival of the next combination update time can be enjoyed.

Further, in the present modified example, since the added bandwidth is determined based on the branch slope value of each PON branch, there is the advantageous effect that the PON branch combination can be determined so that there is little excess or shortage of spare bandwidth.

<Second Modified Example>

Figure 15:
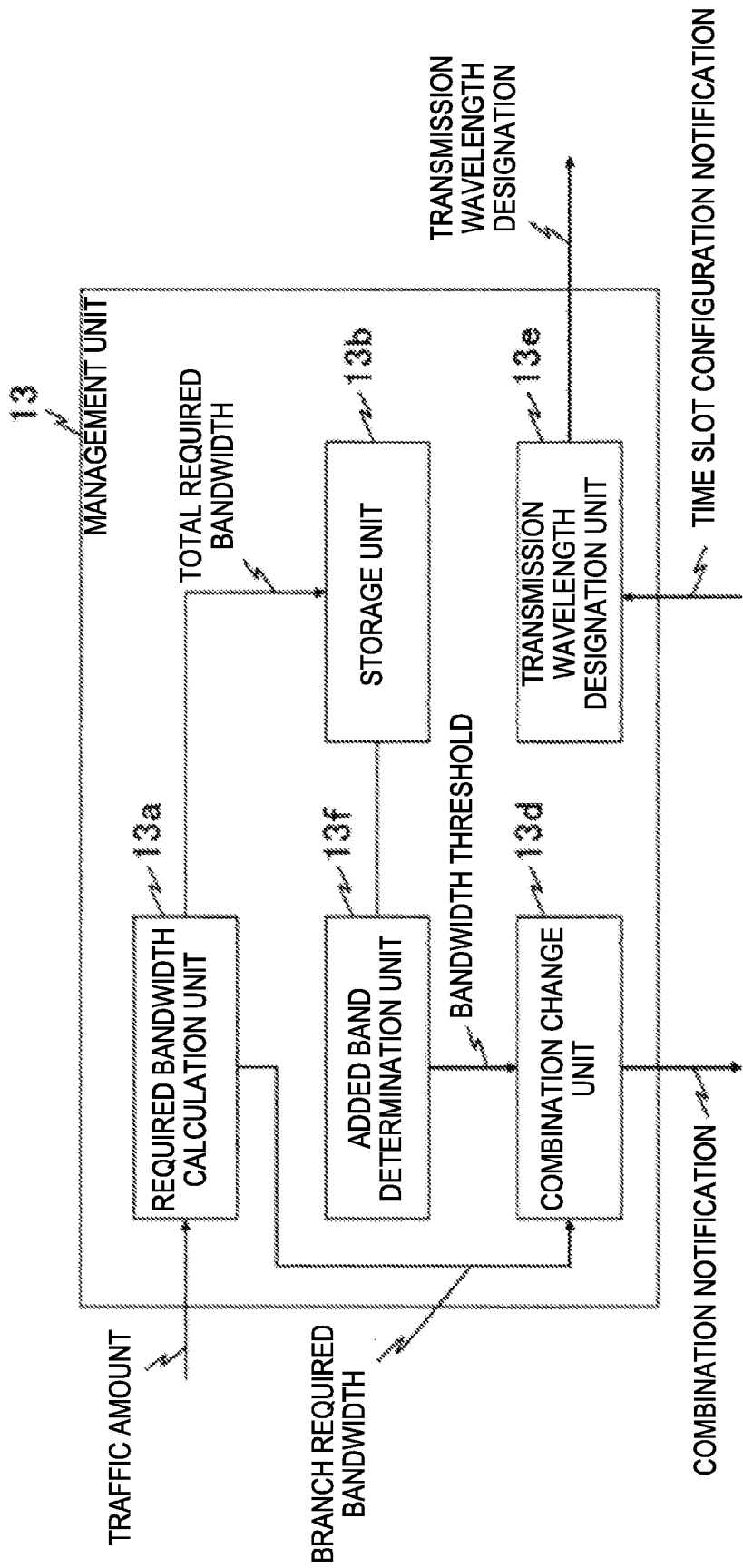
FIG. 15 is a block diagram illustrating a configuration of a management unit according to a modified example.

Although the above modified example was an embodiment relating to the downward communication direction, the PON branch combination can similarly be determined from the branch slope value of each PON branch even for the uplink communication direction. Here, the configuration of the management unit 13 is illustrated in FIG. 15 similar to the first modified example. Further, the added bandwidth table is illustrated in FIG. 17 similar to the first modified example.

Figure 20:
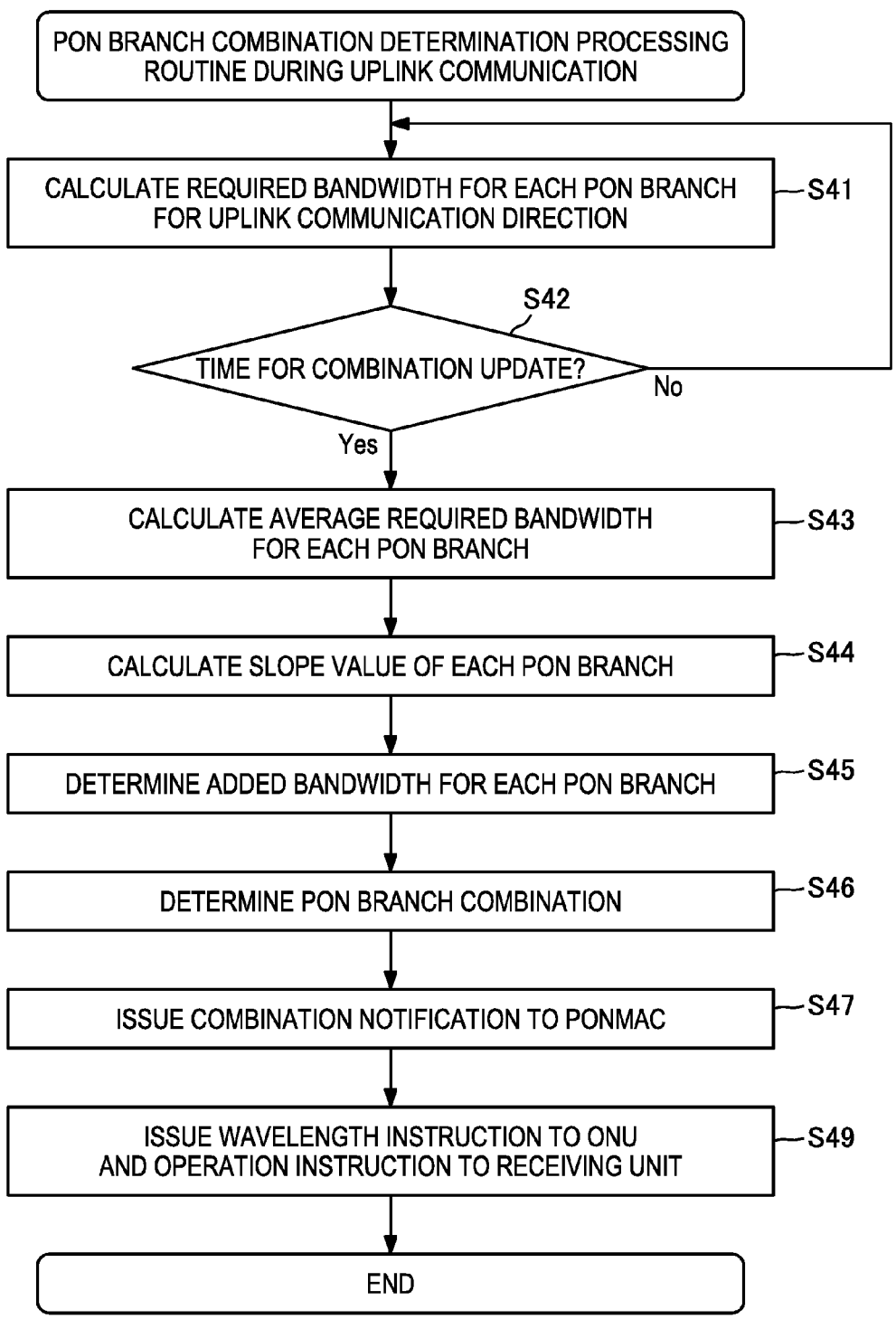
FIG. 20 is a flowchart illustrating a PON branch combination change processing routine performed during uplink communication according to a modified example.

The PON branch combination determination processing performed by the management unit 13 during uplink communication will now be described with reference to FIG. 20. The exchange device 10 starts communication between the ONU groups 40-1 to 40-M based on a typical communication establishment process on an EPON.

After communication has started, the required bandwidth calculation unit 13a calculates the required bandwidth (ONU required bandwidth) for each ONU using the buffer accumulated amount for each of the ONU groups 40-1 to 40-M, which is included in a report signal that periodically or intermittently arrives via the optical transmission paths 30-1 to 30-M, as a required bandwidth. Further, the required bandwidth calculation unit 13a periodically or intermittently calculates the required bandwidth for each PON branch (branch required bandwidth) using, for example, Equation (4) from the ONU required bandwidth for each ONU (step S41). The branch required bandwidth is stored in the storage unit 13b.

The added bandwidth determination unit 13f determines the added bandwidth of each PON branch each time an update time arrives (step S42).

First, using the branch required bandwidth stored in the storage unit 13b, the added bandwidth determination unit 13f calculates the average value (branch average required bandwidth) of the branch required bandwidth of each PON branch included in the period between the previous update time and the current update time using, for example, Equation (5) (step S43).

Next, the added bandwidth determination unit 13f calculates the branch slope value of each PON branch (step S44). In this operation, the added bandwidth determination unit 13f compares the current branch average required bandwidth with the immediately prior branch average required bandwidth for a given PON branch, and calculates the branch slope value for that one PON branch based on the amount of change from the immediately prior branch average required bandwidth using, for example, Equation (6).

Next, the added bandwidth determination unit 13f determines the added bandwidth for each PON branch based on the branch slope value and, for example, the added bandwidth table illustrated in FIG. 17 (step S45).

After the added bandwidth determination unit 13f has determined the added bandwidth, the added bandwidth determination unit 13f determines the PON branch combination (step S46). In this operation, the combination change unit 13d determines the combination so that the total of the confirmed bandwidths for the respective PON branches (total of the branch required bandwidth and the added bandwidth) does not exceed the setting threshold.

Next, the combination change unit 13d issues a combination notification indicating this combination to the PON MAC 14 (step S47). Further, the combination change unit 13d also issues a combination notification indicating this combination to the transmission wavelength designation unit 13e.

The transmission wavelength designation unit 13e determines the transmission wavelength for each ONU group 40-1 to 40-M based on the combination notification from the combination change unit 13d, and designates this transmission wavelength for each ONU group 40-1 to 40-M via the optical transmission paths 30-1 to 30-M (step S48). During this operation, the transmission wavelength designation unit 13e designates the transmission wavelength for each of the ONUs so that each piece of uplink data from the ONU belonging to a given PON branch group is transmitted to one output port of the AWG 16.

The combination change unit 13d sets the receiving units among receiving units 15b-1 to 15b-N that, based on the combination result, have not been allocated with a PON branch to sleep mode (step S48).

As described above, in the exchange device 10 according to the present embodiment, an added bandwidth is determined based on the required bandwidth for uplink communication for each PON branch. The total of the required bandwidth and the added bandwidth is set as a confirmed bandwidth, and the PON branch combination for each unit is determined so that the total of the confirmed bandwidths does not exceed the maximum data rate of the transmission unit. Based on such an operation, the total value of the branch required bandwidths for the respective receiving units is less than the maximum data rate, so that each receiving unit has spare bandwidth with respect to the maximum data rate. Consequently, the advantageous effect that insufficient bandwidth is less likely to occur even if the branch required bandwidth increases in the period between determination of the PON branch combination and arrival of the next combination update time can be enjoyed.

Further, in the present modified example, since the added bandwidth is determined based on the branch slope value of each PON branch, there is the advantageous effect that the PON branch combination can be determined so that there is little excess or shortage of spare bandwidth.

What is claimed is:

1. An exchange device comprising:
   a multiplexing unit configured to generate a plurality of series of multiplexed data by multiplexing for each PON branch group communication data having as a transmission destination any of a plurality of optical network units respectively belonging to one of a plurality of PON branches;
   a wavelength designation unit configured to designate a transmission wavelength corresponding to the PON branches for each piece of communication data;
   a plurality of transmission units configured to transmit each piece of communication data forming the multiplexed data using a carrier wave of the designated transmission wavelength;
   a selection and transmission unit configured to transmit each piece of transmitted communication data to one of the plurality of PON branches selected based on the transmission wavelength; and
   a combination change unit configured to change a combination of the PON branches included in the PON branch group based on a traffic amount of the communication data,
   wherein the combination change unit comprises:
      an average value calculation unit configured to intermittently calculate an average value of a total traffic amount of the communication data;
      a threshold setting unit configured to set a threshold based on a change in the average value; and
      a combination unit configured to combine any of the plurality of PON branches and setting the combination as the PON branch group so that a sum value of the required bandwidth for each of the PON branches does not exceed the threshold.

2. The exchange device according to claim 1, wherein the threshold setting unit is configured to increase the threshold when the average value has decreased an decrease the threshold when the average value has increased.

3. The exchange device according to claim 2, wherein the threshold setting unit is configured to increase an amount of change of the threshold the greater the amount of change to the average value is.

4. An exchange device comprising:
   a multiplexing unit configured to generate a plurality of series of multiplexed data by multiplexing for each PON branch group communication data having as a transmission destination any of a plurality of optical network units respectively belonging to one of a plurality of PON branches;
   a wavelength designation unit configured to designate a transmission wavelength corresponding to the PON branches for each piece of communication data;

a plurality of transmission units configured to transmit each piece of communication data forming the multiplexed data using a carrier wave of the designated transmission wavelength;

a selection and transmission unit configured to transmit each piece of transmitted communication data to one of the plurality of PON branches selected based on the transmission wavelength; and a combination change unit configured to change a combination of the PON branches included in the PON branch group based on a traffic amount of the communication data, wherein the combination change unit comprises:

an average value calculation unit configured to intermittently calculate an average value of required bandwidth for each of the PON branches;

an added bandwidth determination unit configured to determine an added bandwidth for each of the PON branches based on a change in the average value; and a combination unit configured to combine any of the plurality of PON branches and setting the combination as the PON branch group so that a sum value of confirmed bandwidth for each of the PON branches obtained by adding the required bandwidth and the added bandwidth for each of the PON branches does not exceed a maximum data rate of the transmission unit.

5. An exchange device comprising:

a selection and transmission unit configured to multiplex communication data that has arrived via an optical transmission path from a plurality of optical network units respectively belonging to one of a plurality of PON branches and transmitting the multiplexed data to one output port selected from among a plurality of output ports based on the transmission wavelength of the communication data;

a plurality of receiving units each receiving the communication data via one of the output ports;

a grouping unit configured to group the plurality of PON branches into PON branch groups based on the required bandwidth of each of the optical network units; and a transmission wavelength designation unit configured to designate the transmission wavelength for each of the optical network units so that each piece of the communication data from one of the PON branch groups is transmitted to one of the ports by the selection and transmission unit, wherein the grouping unit comprises:

an average value calculation unit configured to intermittently calculate an average value of a total required bandwidth of the optical network units;

a threshold setting unit configured to set a threshold based on change in the average value; and a combination unit configured to combine the plurality of PON branches and setting the combination as the PON branch group so that a sum value of the current required bandwidth for each of the PON branches does not exceed the threshold.

6. The exchange device according to claim 5, wherein the threshold setting unit is configured to increase the threshold when the average value has decreased and decrease the threshold when the average value has increased.

7. The exchange device according to claim 6, wherein the threshold setting unit is configured to increase an amount of change of the threshold the greater the amount of change to the average value is.

8. An exchange device comprising:

a selection and transmission unit configured to multiplex communication data that has arrived via an optical transmission path from a plurality of optical network units respectively belonging to one of a plurality of PON branches and transmitting the multiplexed data to one output port selected from among a plurality of output ports based on the transmission wavelength of the communication data;

a plurality of receiving units each receiving the communication data via one of the output ports;

a grouping unit configured to group the plurality of PON branches into PON branch groups based on the required bandwidth of each of the optical network units; and a transmission wavelength designation unit configured to designate the transmission wavelength for each of the optical network units so that each piece of the communication data from one of the PON branch groups is transmitted to one of the ports by the selection and transmission unit, wherein the grouping unit comprises:

an average value calculation unit configured to intermittently calculate an average value of required bandwidth for each of the PON branches;

an added bandwidth determination unit configured to determine an added bandwidth for each of the PON branches based on a change in the average value; and a combination unit configured to combine any of the plurality of PON branches and setting the combination as the PON branch group so that a sum value of confirmed bandwidth for each of the PON branches obtained by adding the required bandwidth and the added bandwidth for each of the PON branches does not exceed a maximum data rate of the receiving unit.

* * * * *